US012236867B2

(12) United States Patent
Huangfu et al.

(10) Patent No.: US 12,236,867 B2
(45) Date of Patent: Feb. 25, 2025

(54) PIXEL DRIVING CIRCUIT, DISPLAY PANEL, METHOD OF DRIVING DISPLAY PANEL

(71) Applicant: BOE Technology Group Co., Ltd., Beijing (CN)

(72) Inventors: Lujiang Huangfu, Beijing (CN); Li Wang, Beijing (CN); Jianchao Zhu, Beijing (CN); Libin Liu, Beijing (CN); Yu Feng, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/789,174

(22) PCT Filed: Sep. 30, 2021

(86) PCT No.: PCT/CN2021/122038
§ 371 (c)(1),
(2) Date: Jun. 25, 2022

(87) PCT Pub. No.: WO2023/050255
PCT Pub. Date: Apr. 6, 2023

(65) Prior Publication Data
US 2024/0177660 A1 May 30, 2024

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2310/08* (2013.01); *G09G 2320/0247* (2013.01)

(58) Field of Classification Search
CPC ......... G09G 3/3233; G09G 2300/0819; G09G 2300/0842; G09G 2310/08; G09G 2320/0247
See application file for complete search history.

(56) References Cited

U.S. PATENT DOCUMENTS

| | | | | |
|---|---|---|---|---|
| 2008/0224964 | A1 | 9/2008 | Tanikame et al. | |
| 2010/0277455 | A1 | 11/2010 | Miwa et al. | |
| 2013/0033475 | A1 | 2/2013 | Miyake | |
| 2013/0300724 | A1* | 11/2013 | Chaji | G09G 3/3258 345/212 |
| 2014/0139503 | A1* | 5/2014 | Han | G09G 3/3233 345/212 |

FOREIGN PATENT DOCUMENTS

| | | | |
|---|---|---|---|
| CN | 101266754 | A | 9/2008 |
| CN | 101828213 | A | 9/2010 |
| CN | 109523953 | A | 3/2019 |
| JP | 2005352411 | A | 12/2005 |
| JP | 2008310075 | A | 12/2008 |

OTHER PUBLICATIONS

International Search Report & Written Opinion mailed Jun. 23, 2022, regarding PCT/CN2021/122038.

* cited by examiner

*Primary Examiner* — Stacy Khoo

(74) *Attorney, Agent, or Firm* — Intellectual Valley Law, P.C.

(57) ABSTRACT

A pixel driving circuit is provided. The pixel driving circuit includes a storage capacitor (Cst) having a first capacitor electrode (Ce1) and a second capacitor electrode (Ce2); a driving transistor (Td) configured to generate a driving current; and a switch (SW) configured to control connection or disconnection between a gate electrode of the driving transistor (Td) and the first capacitor electrode (Ce1).

15 Claims, 16 Drawing Sheets

PIXEL DRIVING CIRCUIT, DISPLAY PANEL, METHOD OF DRIVING DISPLAY PANEL

CROSS-REFERENCE TO RELATED APPLICATION

This application is a national stage application under 35 U.S.C. § 371 of International Application No. PCT/CN2021/122038, filed Sep. 30, 2021, the contents of which are incorporated by reference in the entirety.

TECHNICAL FIELD

The present invention relates to display technology, more particularly, to a pixel driving circuit, a display panel, and a method of driving a display panel.

BACKGROUND

In an organic light emitting diode display panel, transfer characteristics of a gate voltage of a driving transistor during a transition from a positive voltage to a negative voltage (i.e., a positive scanning) is different from that during a transition from a negative voltage to a positive voltage (i.e., a negative scanning). This phenomenon is referred to as the hysteresis effect of the transistor.

SUMMARY

In one aspect, the present disclosure provides a pixel driving circuit, comprising a storage capacitor comprising a first capacitor electrode and a second capacitor electrode; a driving transistor configured to generate a driving current; and a switch configured to control connection or disconnection between a gate electrode of the driving transistor and the first capacitor electrode.

Optionally, the switch is configured to electrically disconnect the gate electrode of the driving transistor from the first capacitor electrode for a first period of time during operation of the pixel driving circuit and to electrically connect the gate electrode of the driving transistor to the first capacitor electrode for a second period of time during operation of the pixel driving circuit.

Optionally, the first period of time comprises at least a portion of a reset phase of the operation; and the second period of time comprises at least a portion of a data write phase of the operation.

Optionally, the switch comprises a transistor comprising a first electrode connected to the first capacitor electrode, a second electrode connected to a gate electrode of the driving transistor, and a gate electrode connected to a scan line.

Optionally, the pixel driving circuit further comprises a reset transistor configured to initialize the first capacitor electrode in a reset phase of the operation; wherein a first electrode of the reset transistor is connected to an initialization signal line; a second electrode of the reset transistor is connected to the first capacitor electrode; and the switch is configured to electrically disconnect the gate electrode of the driving transistor from the first capacitor electrode during at least a portion of a period in which the reset transistor is turned on.

Optionally, the pixel driving circuit further comprises a data write transistor configured to allow a data signal to pass through in a data write phase of the operation; a first electrode of the data write transistor is connected to a data line; a gate electrode of the data write transistor is connected to a gate line; and the switch is configured to electrically connect the gate electrode of the driving transistor to the first capacitor electrode during at least a portion of a period in which the data write transistor is turned on.

Optionally, the pixel driving circuit further comprises a reset transistor having a first electrode connected to an initialization signal line, a second electrode connected to the first capacitor electrode; a data write transistor having a first electrode connected to a data line, and a gate electrode connected to a gate line; a first transistor having a first electrode connected to a second electrode of the driving transistor, a gate electrode connected to a light emission control signal line, and a second electrode connected to an anode of a light emitting element; and a second transistor having a first electrode connected to the first capacitor electrode, and a second electrode connected to the second electrode of the driving transistor.

Optionally, all transistors are p-type transistors.

Optionally, the reset transistor and the second transistor are n-type transistors; and the driving transistor, the first transistor, the data write transistor, the transistor of the switch are p-type transistors.

In another aspect, the present disclosure provides a display panel, comprising the pixel driving circuit described herein or fabricated by a method described herein; and a light emitting element connected to the pixel driving circuit.

Optionally, the display panel further comprises a scan line; wherein the switch comprises a transistor comprising a first electrode connected to the first capacitor electrode, a second electrode connected to a gate electrode of the driving transistor, and a gate electrode connected to the scan line.

Optionally, the display panel further comprises a reset transistor configured to initialize the first capacitor electrode in a reset phase of operation of the pixel driving circuit; wherein gate electrodes of the reset transistor and the transistor of the switch are configured to be provided with a same scanning signal; wherein the reset transistor is a n-type transistor; and the driving transistor and the transistor of the switch are p-type transistors.

Optionally, gate electrodes of the reset transistor and the transistor of the switch are connected to a same scan line.

Optionally, the display panel further comprises a data write transistor configured to allow a data signal to pass through in a data write phase of operation of the pixel driving circuit; wherein gate electrodes of the data write transistor and the transistor of the switch are configured to be provided with a same scanning signal.

Optionally, the scan line is a gate line of a present stage; and gate electrodes of the data write transistor and the transistor of the switch are connected to the gate line of the present stage.

Optionally, the scan line is a light emission control signal line of a previous stage.

In another aspect, the present disclosure provides a method of driving a display panel, in a present frame of image display, comprising electrically disconnecting a gate electrode of a driving transistor from a first capacitor electrode of a storage capacitor for a first period of time during operation of a pixel driving circuit; and electrically connecting the gate electrode of the driving transistor to the first capacitor electrode for a second period of time during operation of the pixel driving circuit.

Optionally, the first period of time comprises at least a portion of a reset phase of operation of the pixel driving circuit; and the second period of time comprises at least a portion of a data write phase of the operation.

Optionally, the reset phase comprises a first sub-phase and a second sub-phase, the first sub-phase being earlier in time than the second sub-phase; the first period of time comprises only the first sub-phase; and the second period of time comprises the second sub-phase and at least a portion of the data write phase.

Optionally, the first period of time comprises at least a portion of the reset phase of the operation in the present frame of image display, and at least a portion of a light emission phase of the operation in a previous frame of image display.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Figure 1:
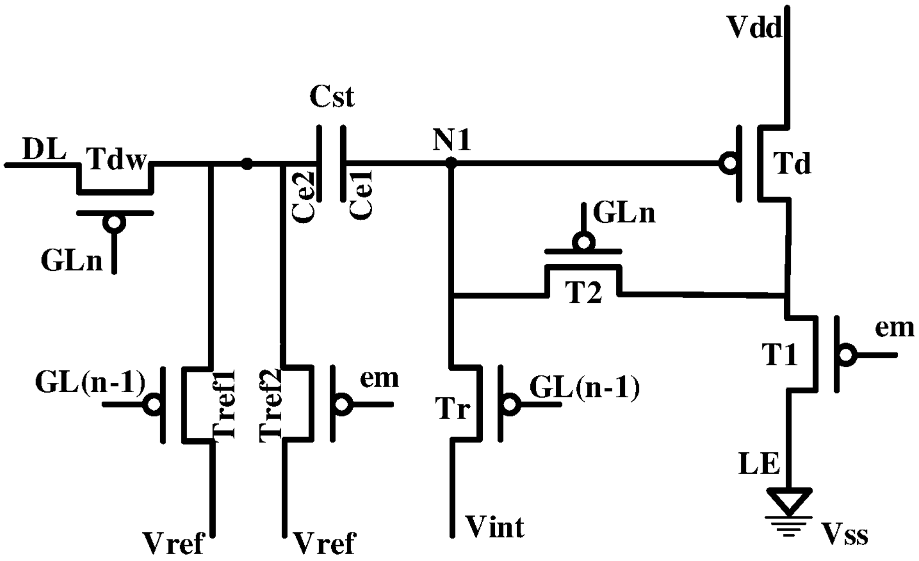
FIG. 1 is a circuit diagram of a pixel driving circuit in some embodiments according to the present disclosure.
Figure 2:
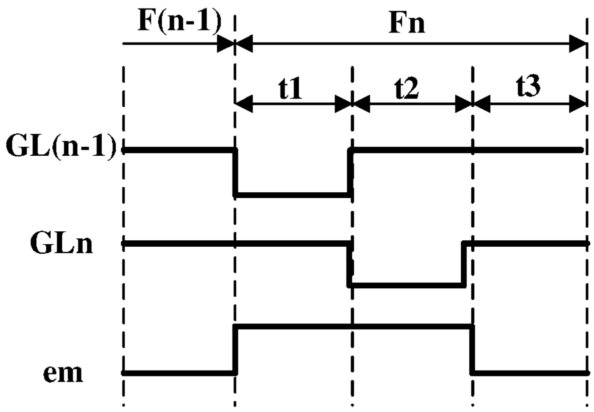
FIG. 2 is a timing diagram of operating a display panel having a pixel driving circuit depicted in FIG. 1.

FIG. 1 is a circuit diagram of a pixel driving circuit in some embodiments according to the present disclosure. FIG. 2 is a timing diagram of operating a display panel having a pixel driving circuit depicted in FIG. 1. Referring to FIG. 1, the pixel driving circuit in the example includes a storage capacitor Cst having a first capacitor electrode Ce1 and a second capacitor electrode Ce2. The first capacitor electrode Ce1 has a same voltage level as a N1 node of the pixel driving circuit. The pixel driving circuit further includes a driving transistor Td having a gate electrode connected to the first capacitor electrode Ce1, a first electrode connected to a voltage supply signal line Vdd, and a second electrode connected to a first electrode of a first transistor T1; a reset transistor Tr having a gate electrode connected to a gate line of a previous stage GL(n−1), a first electrode connected to an initialization signal line Vint, and a second electrode connected to the first capacitor electrode Ce1; and a data write transistor Tdw having a gate electrode connected to a gate line of a present stage GLn, a first electrode connected to a data line DL, and a second electrode connected to the second capacitor electrode Ce2. Moreover, the pixel driving circuit further includes a first transistor T1 having a gate electrode connected to a light emission control signal line em, a first electrode connected to the second electrode of the driving transistor Td, and a second electrode connected to an anode of a light emitting element LE. A cathode of the light emitting element is connected to a low voltage signal line Vss. Moreover, the pixel driving circuit further includes a second transistor T2 having a gate electrode connected to the gate line of a present stage GLn, a first electrode connected to the first capacitor electrode Ce1, and a second electrode connected to the second electrode of the driving transistor Td and the first electrode of the first transistor T1. Optionally, the pixel driving circuit further includes a first reference transistor Tref1 having a gate electrode connected to the gate line of a previous stage GL(n−1), a first electrode connected to a reference signal line Vref, and a second electrode connected to the second capacitor electrode Ce2; and a second reference transistor Tref2 having a gate electrode connected to the light emission control signal line em, a first electrode connected to the reference signal line Vref, and a second electrode connected to the second capacitor electrode Ce2.

Referring to FIG. 2, a present frame of image display Fn and a previous frame of image display F(n−1) are shown with respect to the pixel driving circuit. In the present frame of image display (or in the previous frame of image display), the operation of the pixel driving circuit includes at least a reset phase t1, a data write phase t2, and a light emission phase t3.

Referring to FIG. 1 and FIG. 2, in the reset phase t1, the reset transistor Tr is turned on by receiving a turning-on voltage signal at the gate electrode, allowing an initialization signal to pass from the initialization signal line Vint through the reset transistor Tr to the first capacitor electrode Ce1 (the N1 node), thereby resetting the first capacitor electrode Ce1. By having the reset phase, any residual signal from the previous frame of image display F(n−1) remaining at the first capacitor electrode Ce1 may be eliminated, so that image display in the present frame Fn is not affected by the residual signal. At the same time, the gate-source voltage Vgs is biased to turn on the driving transistor Td.

In the data write phase t2, the data write transistor Tdw receives a turning-on voltage signal at the gate electrode, allowing a data signal to pass from the data line DL through the data write transistor Tdw to the second capacitor electrode Ce2. In the data write phase t2, a voltage signal passes from the voltage supply signal line Vdd through the driving transistor Td and the second transistor T2 to the first capacitor electrode Ce1 (the N1 node). The voltage signal charges the N1 node until the voltage level at the N1 node increases to a threshold voltage Vth of the driving transistor Td, at which point the driving transistor Td is nearly turned off.

In the light emission phase t3, a reference voltage signal passes from the reference signal line Vref through the second reference transistor Tref2 to the second capacitor electrode Ce2, quickly switching the voltage level at the second capacitor electrode Ce2 from the voltage level of the data signal to a voltage level of the reference voltage signal in a transient process. Through capacitor coupling by the storage capacitor Cst, a signal (Vref−Vdt) is written to the gate electrode of the driving transistor Td. The gate-source voltage Vgs of the driving transistor Td is changed to:

$V_{gs}=V_{ref}-V_{dt}+V_{th}$; wherein $V_{ref}$ represents a voltage level of the reference voltage signal, $V_{dt}$ represents a voltage level of the data signal, and $V_{th}$ represents a threshold voltage of the driving transistor Td.

In the light emission phase t3, the gate-source voltage Vgs controls the driving transistor Td to output a driving current Ids.

$$I_{ds}=\frac{1}{2}K(V_{gs}-V_{th})^2=\frac{1}{2}K(V_{ref}-V_{dt})^2;$$

wherein K stands for a gain coefficient of the driving transistor Td. Thus, the driving current Ids is not directly correlated to the threshold voltage Vth. Adverse effects of the threshold voltage Vth (e.g., non-uniformity of the threshold voltage Vth) on the driving current can be eliminated.

Figure 3:
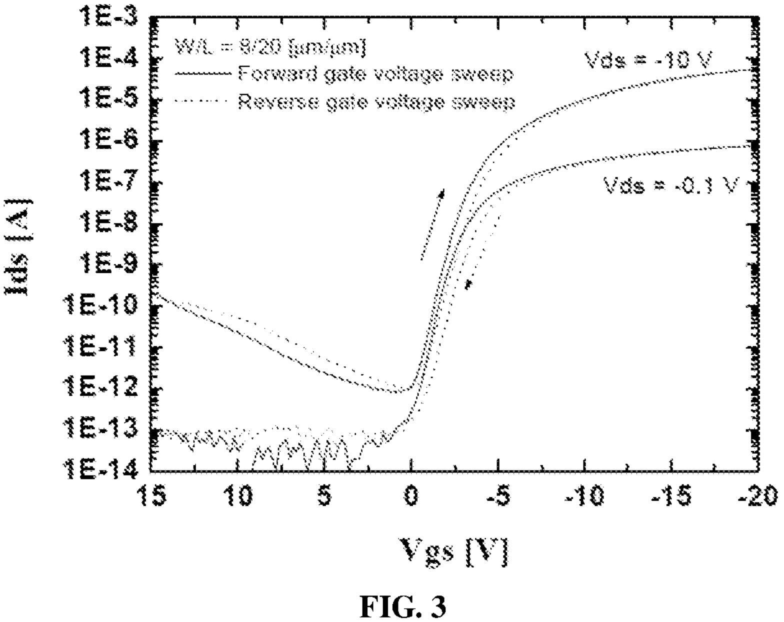
FIG. 3 shows an Ids-Vgs characteristics curve of a driving transistor in some embodiments according to the present disclosure.

In the reset phase t1, the driving transistor Td is turned on because the N1 node is negatively biased by the initialization signal. Typically, interfacial state energy levels exist at an interface between a channel part of the transistor and a gate insulating layer. Because of the existence of the interfacial state energy levels, different gate bias voltage could affect states of carrier capture and release. In one example, when the gate electrode of the driving transistor Td is highly negatively biased, p-type carriers in the channel part of the driving transistor Td are prone to be captured and accumulated by the interfacial state, resulting in a gradual decrease in the threshold voltage Vth. FIG. 3 shows an Ids-Vgs characteristics curve of a driving transistor in some embodiments according to the present disclosure. As shown in FIG. 3, the gradual decrease in the threshold voltage Vth results in a left shift of the characteristics curve. In another example, when the voltage level at the gate electrode of the driving transistor Td increases to a level for driving light emission, the p-type carriers trapped in the interfacial state are released and dissipated, resulting in a gradual increase in the threshold voltage Vth. As shown in FIG. 3, the gradual increase in the threshold voltage Vth results in a right shift of the characteristics curve. The phenomenon of threshold voltage variation with the gate voltage bias is known as hysteresis characteristics of a transistor. Typically, the process in which the carriers are captured and accumulates is faster than the process in which the carriers are released and dissipated, causing a residual threshold voltage variation after the pixel driving circuit is operated in the light emission phase, adversely affecting the driving current and grayscale of image display.

In the light emission phase, the voltage level at the N1 node is stabilized by the storage capacitor. Because the light emission phase is a relatively lengthy stage, leakage through, for example, the reset transistor Tr and the second transistor T2 would affect the voltage level at the N1 node, the driving current of the driving transistor, and the image display grayscale. In a display panel having a relatively high frame frequency, human eyes are not sensitive to the small fluctuation in the image display grayscale. In a display panel having a relatively low frame frequency, however, human eyes can detect the flicker caused by the fluctuation.

Accordingly, the present disclosure provides, inter alia, a pixel driving circuit, a display panel, and a method of driving a display panel that substantially obviate one or more of the problems due to limitations and disadvantages of the related art. In one aspect, the present disclosure provides a pixel driving circuit. In some embodiments, the pixel driving circuit includes a storage capacitor comprising a first capacitor electrode and a second capacitor electrode; a driving transistor configured to generate a driving current; and a switch configured to control connection or disconnection between a gate electrode of the driving transistor and the first capacitor electrode. The inventors of the present disclosure discover a novel pixel driving circuit, a display panel, and a method of driving a display panel that obviate the flicker and fluctuation issues caused by the hysteresis characteristics of the driving transistor. The present disclosure is applicable to driving transistors of any types, including a p-type transistor and a n-type transistor.

Figure 4:
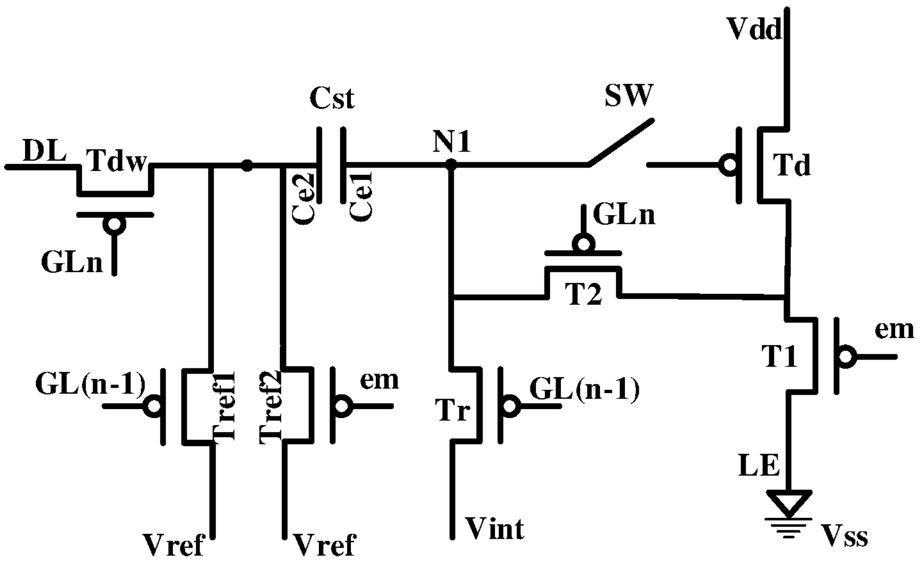
FIG. 4 is a circuit diagram of a pixel driving circuit in some embodiments according to the present disclosure.

FIG. 4 is a circuit diagram of a pixel driving circuit in some embodiments according to the present disclosure. Referring to FIG. 4, the pixel driving circuit in some embodiments includes a switch SW configured to control connection or disconnection between a gate electrode of the driving transistor Td and the first capacitor electrode Ce1 of the storage capacitor Cst.

In one example, as shown in FIG. 4, the pixel driving circuit includes a storage capacitor Cst having a first capacitor electrode Ce1 and a second capacitor electrode Ce2; a driving transistor Td having a first electrode connected to a voltage supply signal line Vdd, and a second electrode connected to a first electrode of a first transistor T1; a switch SW configured to control connection or disconnection between a gate electrode of the driving transistor Td and the first capacitor electrode Ce1; wherein a gate electrode of the driving transistor Td is connected to the switch SW; and the first capacitor electrode Ce1 is connected to the switch SW. Referring to FIG. 4, the pixel driving circuit further includes a reset transistor Tr having a gate electrode connected to a gate line of a previous stage GL(n−1), a first electrode connected to an initialization signal line Vint, and a second electrode connected to the first capacitor electrode Ce1; and a data write transistor Tdw having a gate electrode connected to a gate line of a present stage GLn, a first electrode connected to a data line DL, and a second electrode connected to the second capacitor electrode Ce2. Moreover, the pixel driving circuit further includes a first transistor T1 having a gate electrode connected to a light emission control signal line em, a first electrode connected to the second electrode of the driving transistor Td, and a second electrode connected to an anode of a light emitting element LE. A cathode of the light emitting element is connected to a low voltage signal line Vss. Moreover, the pixel driving circuit further includes a second transistor T2 having a gate electrode connected to the gate line of a present stage GLn, a first electrode connected to the first capacitor electrode Ce1, and a second electrode connected to the second electrode of the driving transistor Td and the first electrode of the first transistor T1. Optionally, the pixel driving circuit further includes a first reference transistor Tref1 having a gate electrode connected to the gate line of a previous stage GL(n−1), a first electrode connected to a reference signal line Vref, and a second electrode connected to the second capacitor electrode Ce2; and a second reference transistor Tref2 having a gate electrode connected to the light emission control signal line em, a first electrode connected to the reference signal line Vref, and a second electrode connected to the second capacitor electrode Ce2.

As an example, FIG. 4 describes a pixel driving circuit having p-type transistors. The present disclosure may be implemented in pixel driving circuit having transistors of various types, including a pixel driving circuit having p-type transistors, a pixel driving circuit having n-type transistors, and a pixel driving circuit having one or more p-type transistors and one or more n-type transistors.

Figure 5:
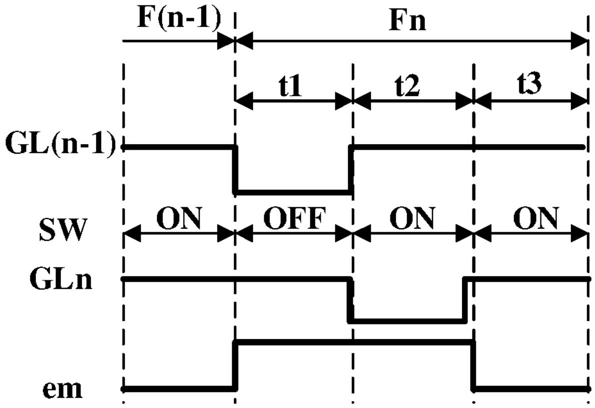
FIG. 5 is a timing diagram of operating a display panel having a pixel driving circuit depicted in FIG. 4.

In some embodiments, the switch SW is configured to electrically disconnect the gate electrode of the driving transistor Td from the first capacitor electrode Ce1 for a first period of time during operation of the pixel driving circuit and to electrically connect the gate electrode of the driving transistor Td to the first capacitor electrode Ce1 for a second period of time during operation of the pixel driving circuit. Optionally, the switch SW is configured to electrically disconnect the gate electrode of the driving transistor Td from the first capacitor electrode Ce1 in at least a portion of a reset phase of the operation; and to electrically connect the gate electrode of the driving transistor Td to the first capacitor electrode Ce1 in at least a portion of a data write phase of the operation. FIG. 5 is a timing diagram of operating a display panel having a pixel driving circuit depicted in FIG. 4. Referring to FIG. 4 and FIG. 5, the switch SW is configured to electrically disconnect the gate electrode of the driving transistor Td from the first capacitor electrode Ce1 in the reset phase t1 of the operation; and to electrically connect the gate electrode of the driving transistor Td to the first capacitor electrode Ce1 in the data write phase t2 of the operation.

In at least a portion of a reset phase t1 of the operation of the present pixel driving circuit, the switch SW is in an "OFF" state, disconnecting the gate electrode of the driving transistor Td from the first capacitor electrode Ce1. When the switch SW is in an "OFF" state, the gate electrode of the driving transistor Td is in a floating state. The initialization signal passes from the initialization signal line Vint through the reset transistor Tr to the first capacitor electrode Ce1, thereby resetting the first capacitor electrode Ce1. Because the gate electrode of the driving transistor Td is in a floating state, the gate electrode of the driving transistor Td is not initialized.

In at least a portion of the data write phase t2, the switch SW is in an "ON" state, connecting the gate electrode of the driving transistor Td to the first capacitor electrode Ce1. The driving transistor Td is turned on by a voltage level of the initialization signal at the first capacitor electrode Ce1. Once the driving transistor Td is turned on, a voltage signal passes from the voltage supply signal line Vdd through the driving transistor Td and the second transistor T2 to the first capacitor electrode Ce1 (the N1 node), rapidly charging the first capacitor electrode Ce1, which is now electrically connected to the gate electrode of the driving transistor Td. The voltage level at the gate electrode of the driving transistor Td first rapidly rises to a voltage level of the threshold voltage Vth, then returns to a voltage level of (Vref−Vdt+Vth) by a mechanism of voltage programming, as discussed above. As a result, the duration in which the gate electrode of the driving transistor Td is highly negatively biased is much shorter than that in the operation of the pixel driving circuit depicted in FIG. 1 to FIG. 3, and a degree of left shift of characteristics curve is far smaller than that depicted in FIG. 3. Moreover, the duration in which the gate electrode of the driving transistor Td is positively biased is also shorter than that in the operation of the pixel driving circuit depicted in FIG. 1 to FIG. 3, and a degree of right shift of characteristics curve is also smaller than that depicted in FIG. 3. By reducing the hysteresis effects on the driving transistor Td, the driving current and image display grayscale can be stably maintained without a large degree of fluctuation, significantly improving image display quality.

Figure 6:
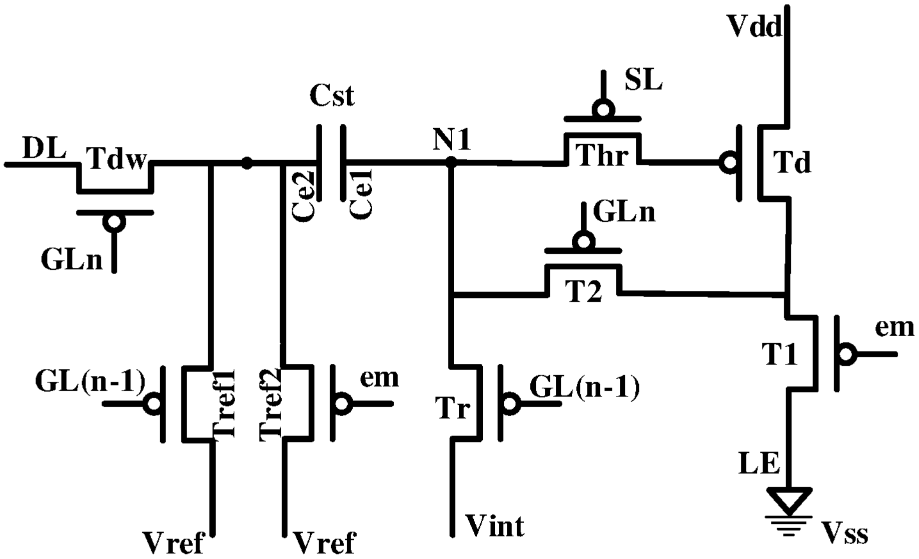
FIG. 6 is a circuit diagram of a pixel driving circuit in some embodiments according to the present disclosure.

FIG. 6 is a circuit diagram of a pixel driving circuit in some embodiments according to the present disclosure. Referring to FIG. 6, in some embodiments, the switch includes a hysteresis reduction transistor Thr having a first electrode connected to the first capacitor electrode Ce1, a second electrode connected to a gate electrode of the driving transistor Td, and a gate electrode connected to a scan line SL.

Figure 7:
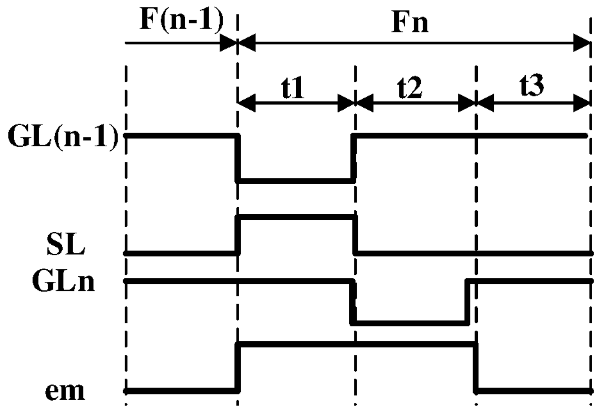
FIG. 7 is a timing diagram of operating a display panel having a pixel driving circuit depicted in FIG. 6.

FIG. 7 is a timing diagram of operating a display panel having a pixel driving circuit depicted in FIG. 6. Referring to FIG. 6 and FIG. 7, in some embodiments, the hysteresis reduction transistor Thr is configured to electrically disconnect the gate electrode of the driving transistor Td from the first capacitor electrode Ce1 for a first period of time during operation of the pixel driving circuit and to electrically connect the gate electrode of the driving transistor Td to the first capacitor electrode Ce1 for a second period of time during operation of the pixel driving circuit. Optionally, the hysteresis reduction transistor Thr is configured to electrically disconnect the gate electrode of the driving transistor Td from the first capacitor electrode Ce1 in at least a portion of a reset phase of the operation; and to electrically connect the gate electrode of the driving transistor Td to the first capacitor electrode Ce1 in at least a portion of a data write phase of the operation. Referring to FIG. 6 and FIG. 7, the hysteresis reduction transistor Thr is configured to electrically disconnect the gate electrode of the driving transistor Td from the first capacitor electrode Ce1 in the reset phase t1 of the operation; and to electrically connect the gate electrode of the driving transistor Td to the first capacitor electrode Ce1 in the data write phase t2 of the operation. Referring to FIG. 7, a present frame of image display Fn and a previous frame of image display F(n−1) are shown with respect to the pixel driving circuit. In the present frame of image display (or in the previous frame of image display), the operation of the pixel driving circuit includes at least a reset phase t1, a data write phase t2, and a light emission phase t3.

Referring to FIG. 6 and FIG. 7, in the reset phase t1, the reset transistor Tr is turned on by receiving a turning-on voltage signal at the gate electrode, allowing an initialization signal to pass from the initialization signal line Vint through the reset transistor Tr to the first capacitor electrode Ce1 (the N1 node), thereby resetting the first capacitor electrode Ce1. In at least a portion of a reset phase t1 of the operation of the present pixel driving circuit, a turning-off signal is transmitted through the scan line SL to the gate electrode of the hysteresis reduction transistor Thr to turn off the hysteresis reduction transistor Thr, thereby disconnecting the gate electrode of the driving transistor Td from the first capacitor electrode Ce1. When the hysteresis reduction transistor Thr is turned off, the gate electrode of the driving transistor Td is in a floating state. The initialization signal passes from the initialization signal line Vint through the reset transistor Tr to the first capacitor electrode Ce1, thereby resetting the first capacitor electrode Ce1. Because the gate electrode of the driving transistor Td is in a floating state, the gate electrode of the driving transistor Td is not initialized.

In the data write phase t2, the data write transistor Tdw receives a turning-on voltage signal at the gate electrode, allowing a data signal to pass from the data line DL through the data write transistor Tdw to the second capacitor electrode Ce2. In at least a portion of the data write phase t2, a turning-on signal is transmitted through the scan line SL to the gate electrode of the hysteresis reduction transistor Thr to turn on the hysteresis reduction transistor Thr, thereby connecting the gate electrode of the driving transistor Td to the first capacitor electrode Ce1. The driving transistor Td is turned on by a voltage level of the initialization signal at the first capacitor electrode Ce1. Once the driving transistor Td is turned on, a voltage signal passes from the voltage supply signal line Vdd through the driving transistor Td and the second transistor T2 to the first capacitor electrode Ce1 (the N1 node), rapidly charging the first capacitor electrode Ce1, which is now electrically connected to the gate electrode of the driving transistor Td. The voltage level at the gate electrode of the driving transistor Td first rapidly rises to a voltage level of the threshold voltage Vth, then returns to a voltage level of (Vref−Vdt+Vth) by a mechanism of voltage programming, as discussed above. The voltage signal charges the N1 node until the voltage level at the N1 node increases to a threshold voltage Vth of the driving transistor Td, at which point the driving transistor Td is nearly turned off.

As a result of the configuration of the pixel driving circuit, the duration in which the gate electrode of the driving transistor Td is highly negatively biased is much shorter than that in the operation of the pixel driving circuit depicted in FIG. 1 to FIG. 3, and a degree of left shift of characteristics curve is far smaller than that depicted in FIG. 3. Moreover, the duration in which the gate electrode of the driving transistor Td is positively biased is also shorter than that in the operation of the pixel driving circuit depicted in FIG. 1 to FIG. 3, and a degree of right shift of characteristics curve is also smaller than that depicted in FIG. 3. By reducing the hysteresis effects on the driving transistor Td, the driving current and image display grayscale can be stably maintained without a large degree of fluctuation, significantly improving image display quality.

In the light emission phase t3, a reference voltage signal passes from the reference signal line Vref through the second reference transistor Tref2 to the second capacitor electrode Ce2, quickly switching the voltage level at the second capacitor electrode Ce2 from the voltage level of the data signal to a voltage level of the reference voltage signal in a transient process. Through capacitor coupling by the storage capacitor Cst, a signal (Vref−Vdt) is written to the gate electrode of the driving transistor Td.

Referring to FIG. 6 and FIG. 7, in the reset phase t1, a turning-on signal passes from a gate line of a previous stage GL(n−1) to the gate electrode of the reset transistor Tr, thereby turning on the reset transistor Tr. An initialization signal passes from the initialization signal line Vint through the reset transistor Tr to the first capacitor electrode Ce1, thereby resetting the voltage level at the first capacitor electrode Ce1. In some embodiments, the hysteresis reduction transistor Thr is configured to electrically disconnect the gate electrode of the driving transistor Td from the first capacitor electrode Ce1 during at least a portion of a period in which the reset transistor Tr is turned on. Optionally, as shown in FIG. 7, the hysteresis reduction transistor Thr is configured to electrically disconnect the gate electrode of the driving transistor Td from the first capacitor electrode Ce1 during substantially an entire period in which the reset transistor Tr is turned on.

Referring to FIG. 6 and FIG. 7, in the data write phase t2, a turning-on signal passes from a gate line of a present stage GLn to the gate electrode of the data write transistor Tdw, thereby turning on the data write transistor Tdw. A data signal passes from the data line DL through the data write transistor Tdw to the second capacitor electrode Ce2. In some embodiments, the hysteresis reduction transistor Thr is configured to electrically connect the gate electrode of the driving transistor Td to the first capacitor electrode Ce1 during at least a portion of a period in which the data write transistor Tdw is turned on. Optionally, as shown in FIG. 7, the hysteresis reduction transistor Thr is configured to electrically connect the gate electrode of the driving transistor Td to the first capacitor electrode Ce1 during substantially an entire period in which the data write transistor Tdw is turned on.

Referring to FIG. 6 and FIG. 7, the hysteresis reduction transistor Thr in some embodiments is turned off in the reset phase t1, and is turned on in the data write phase t2 and the light emission phase t3.

Referring to FIG. 6, in some embodiments, all transistors (including the second transistor T2 and the reset transistor Tr) are p-type transistors.

Figure 8:
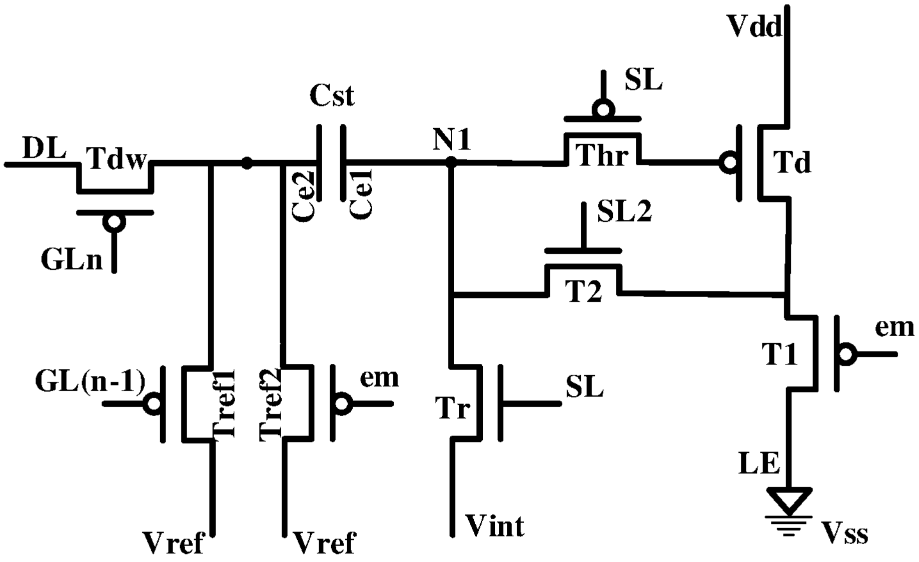
FIG. 8 is a circuit diagram of a pixel driving circuit in some embodiments according to the present disclosure.

In some embodiments, the pixel driving circuit is a pixel driving circuit having one or more p-type transistors and one or more n-type transistors. FIG. 8 is a circuit diagram of a pixel driving circuit in some embodiments according to the present disclosure. Referring to FIG. 8, in one example, the reset transistor Tr and the second transistor T2 are n-type transistors such as metal oxide transistors. Because metal oxide transistors typically have a very small leakage, the voltage level at the N1 node (connected to the reset transistor Tr and the second transistor T2) can be stably maintained, particularly suitable for display panels having a relatively low frame frequency and a relatively long frame period.

Figure 9:
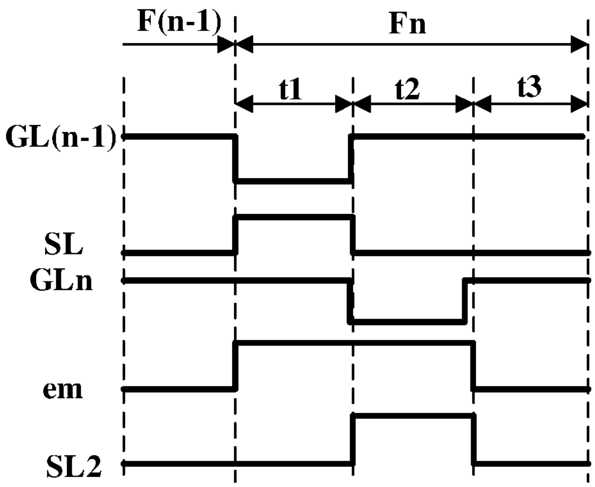
FIG. 9 is a timing diagram of operating a display panel having a pixel driving circuit depicted in FIG. 8.

In some embodiments, gate electrodes of the reset transistor Tr and the hysteresis reduction transistor Thr are configured to be provided with a same scanning signal. Referring to FIG. 8, gate electrodes of the reset transistor Tr and the hysteresis reduction transistor Thr are connected to the scan line SL. FIG. 9 is a timing diagram of operating a display panel having a pixel driving circuit depicted in FIG. 8. Referring to FIG. 8 and FIG. 9, in the reset phase t1, a first scanning signal passes from the scan line SL to gate electrodes of the reset transistor Tr and the hysteresis reduction transistor Thr. The first scanning signal is a turning on signal with respect to the reset transistor Tr, which is a n-type transistor; and the first scanning signal is a turning off signal with respect to the hysteresis reduction transistor Thr, which is a p-type transistor. In the reset phase t1, the reset transistor Tr is turned on, allowing an initialization signal to pass to the first capacitor electrode Ce1; and the hysteresis reduction transistor Thr is turned off to electrically disconnect the gate electrode of the driving transistor Td from the first capacitor electrode Ce1.

In the data write phase t2, a second scanning signal passes from the scan line SL to gate electrodes of the reset transistor Tr and the hysteresis reduction transistor Thr. The second scanning signal is a turning off signal with respect to the reset transistor Tr, which is a n-type transistor; and the second scanning signal is a turning on signal with respect to the hysteresis reduction transistor Thr, which is a p-type transistor. In the data write phase t2, the reset transistor Tr is turned off; and the hysteresis reduction transistor Thr is turned on to electrically connect the gate electrode of the driving transistor Td to the first capacitor electrode Ce1.

The gate electrode of the second transistor T2, which is also a n-type transistor, is connected to a second scan line. In the reset phase t1, a third scanning signal passes from the second scan line SL2 to the gate electrode of the second transistor T2. The third scanning signal is a turning off signal with respect to the second transistor T2, which is a n-type transistor. In the data write phase t2, a fourth scanning signal passes from the second scan line SL2 to the gate electrode of the second transistor T2. The fourth scanning signal is a turning on signal with respect to the second transistor T2. The second transistor T2 is turned on in the data write phase t2, allowing a voltage signal pass from the voltage supply signal line Vdd through the driving transistor Td and the second transistor T2 to the first capacitor electrode Ce1 (the N1 node), rapidly charging the first capacitor electrode Ce1.

Figure 10:
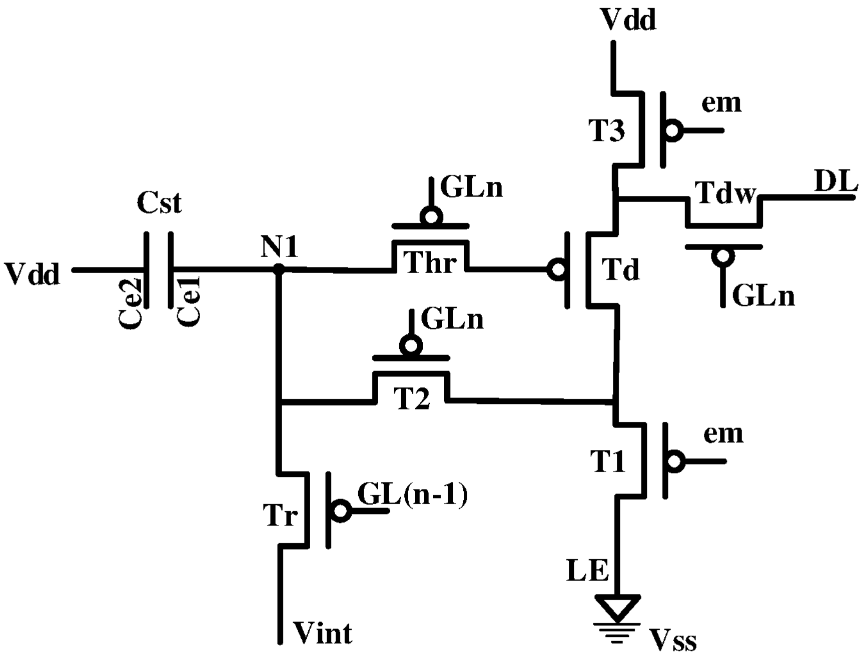
FIG. 10 is a circuit diagram of a pixel driving circuit in some embodiments according to the present disclosure.

FIG. 10 is a circuit diagram of a pixel driving circuit in some embodiments according to the present disclosure. Referring to FIG. 10, in one example, the pixel driving circuit includes a storage capacitor Cst having a first capacitor electrode Ce1 and a second capacitor electrode Ce2; a driving transistor Td having a first electrode connected to a second electrode of a data write transistor Tdw, and a second electrode connected to a first electrode of a first transistor T1; a hysteresis reduction transistor Thr having a first electrode connected to the first capacitor electrode Ce1, a second electrode connected to a gate electrode of the driving transistor Td, and a gate electrode connected to a gate line of a present stage GLn. The second capacitor electrode Ce2 of the storage capacitor Cst is connected to a voltage supply signal line Vdd. The hysteresis reduction transistor Thr is configured to control connection or disconnection between a gate electrode of the driving transistor Td and the first capacitor electrode Ce1; wherein the gate electrode of the driving transistor Td is connected to the second electrode of the hysteresis reduction transistor Thr; and the first capacitor electrode Ce1 is connected to the first electrode of the hysteresis reduction transistor Thr.

Referring to FIG. 10, the pixel driving circuit further includes a reset transistor Tr having a gate electrode connected to a gate line of a previous stage GL(n−1), a first electrode connected to an initialization signal line Vint, and a second electrode connected to the first capacitor electrode Ce1; a first transistor T1 having a gate electrode connected to a light emission control signal line em, a first electrode connected to the second electrode of the driving transistor Td, and a second electrode connected to an anode of a light emitting element LE; a second transistor T2 having a gate electrode connected to the gate line of the present stage GLn, a first electrode connected to the first capacitor electrode Ce1, and a second electrode connected to the second electrode of the driving transistor Td and the first electrode of the first transistor T1; a data write transistor Tdw having a gate electrode connected to a gate line of a present stage GLn, a first electrode connected to a data line DL, and a second electrode connected to a first electrode of the driving transistor Td; and a third transistor T3 having a gate electrode connected to the light emission control signal line em, a first electrode connected to the voltage supply signal line Vdd, and a second electrode connected to the first electrode of the driving transistor Td and the second electrode of the data write transistor Tdw. A cathode of the light emitting element is connected to a low voltage signal line Vss.

In the pixel driving circuit of FIG. 6, in the light emission phase t3, through capacitor coupling by the storage capacitor Cst, a signal (Vref−Vdt) is written to the N1 node. The pixel driving circuit of FIG. 10 has a different operation scheme. In the pixel driving circuit of FIG. 10, in the light emission phase t3, the voltage level at the N1 node remains stable. Because of this characteristics, gate electrodes of the hysteresis reduction transistor Thr and the data write transistor Tdw can be configured to be provided with a same scanning signal.

Figure 11:
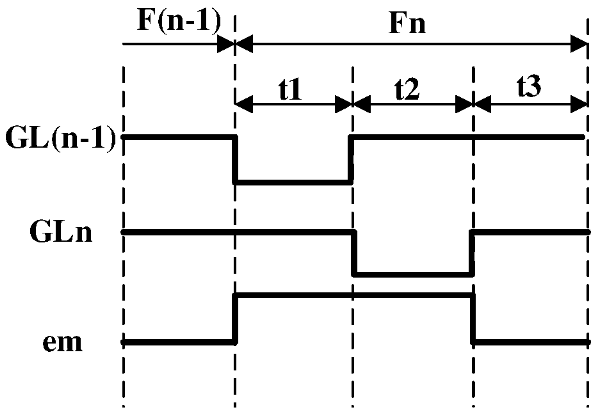
FIG. 11 is a timing diagram of operating a display panel having a pixel driving circuit depicted in FIG. 10.

FIG. 11 is a timing diagram of operating a display panel having a pixel driving circuit depicted in FIG. 10. Referring to FIG. 10 and FIG. 11, in one example, gate electrodes of the hysteresis reduction transistor Thr, the data write transistor Tdw, and the second transistor T2 are connected to a gate line of a present stage GLn. In the reset phase t1, a turning-off signal is transmitted through the gate line of the present stage Gln to the gate electrodes of the hysteresis reduction transistor Thr, the data write transistor Tdw, and the second transistor T2, thereby turning off the hysteresis reduction transistor Thr, the data write transistor Tdw, and the second transistor T2. A turning-on signal is transmitted through a gate line of a previous stage GL(n−1) to the gate electrode of the reset transistor Tr, allowing an initialization signal to be transmitted to the first capacitor electrode Ce1. In the reset phase t1, a turning-off signal is transmitted through a light emission control signal line em to gate electrodes of the first transistor T1 and the third transistor T3, thereby turning off the first transistor T1 and the third transistor T3.

In the data write phase t2, a turning-on signal is transmitted through the gate line of the present stage Gln to the gate electrodes of the hysteresis reduction transistor Thr, the data write transistor Tdw, and the second transistor T2, thereby turning on the hysteresis reduction transistor Thr, the data write transistor Tdw, and the second transistor T2. A turning-off signal is transmitted through the gate line of the previous stage GL(n−1) to the gate electrode of the reset transistor Tr, thereby turning off the reset transistor Tr. In the data write phase t2, a turning-off signal is transmitted through the light emission control signal line em to gate electrodes of the first transistor T1 and the third transistor T3, thereby turning off the first transistor T1 and the third transistor T3.

In the light emission phase t3, a turning-off signal is transmitted through the gate line of the present stage Gln to the gate electrodes of the hysteresis reduction transistor Thr, the data write transistor Tdw, and the second transistor T2, thereby turning off the hysteresis reduction transistor Thr, the data write transistor Tdw, and the second transistor T2. A turning-off signal is transmitted through the gate line of the previous stage GL(n−1) to the gate electrode of the reset transistor Tr, thereby turning off the reset transistor Tr. In the light emission phase t3, a turning-on signal is transmitted through the light emission control signal line em to gate electrodes of the first transistor T1 and the third transistor T3, thereby turning on the first transistor T1 and the third transistor T3.

Figure 12:
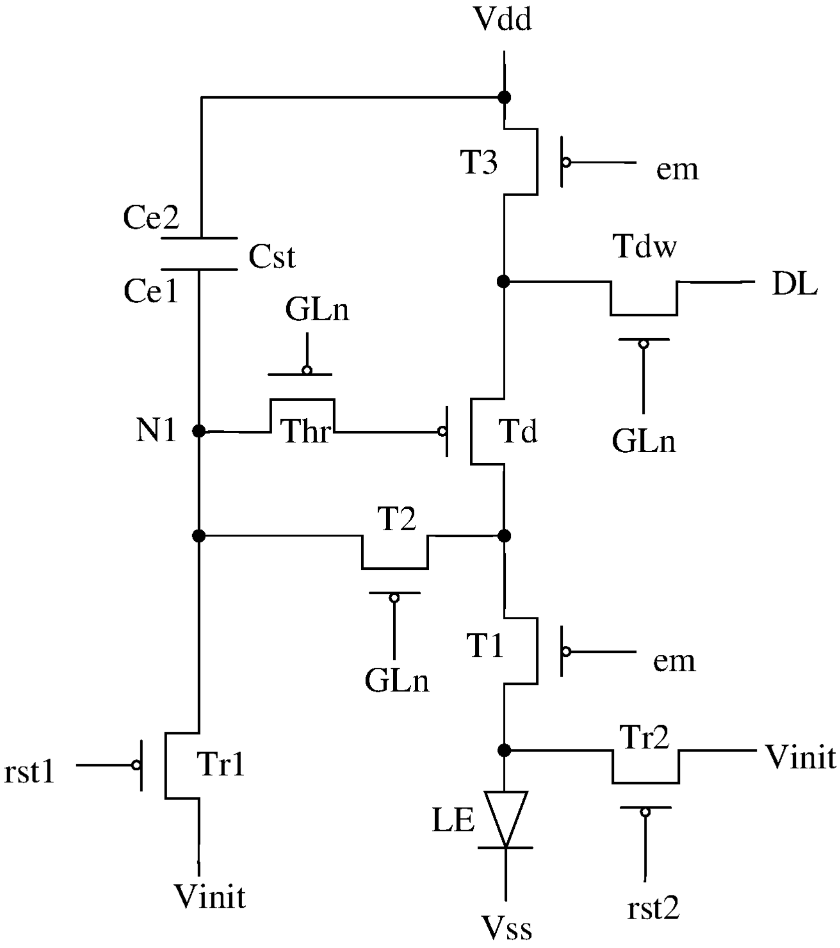
FIG. 12 is a circuit diagram of a pixel driving circuit in some embodiments according to the present disclosure.

FIG. 12 is a circuit diagram of a pixel driving circuit in some embodiments according to the present disclosure. Referring to FIG. 10, in one example, the pixel driving circuit includes a storage capacitor Cst having a first capacitor electrode Ce1 and a second capacitor electrode Ce2; a driving transistor Td having a first electrode connected to a second electrode of a data write transistor Tdw, and a second electrode connected to a first electrode of a first transistor T1; a hysteresis reduction transistor Thr having a first electrode connected to the first capacitor electrode Ce1, a second electrode connected to a gate electrode of the driving transistor Td, and a gate electrode connected to a gate line of a present stage GLn. The second capacitor electrode Ce2 of the storage capacitor Cst is connected to a voltage supply signal line Vdd. The hysteresis reduction transistor Thr is configured to control connection or disconnection between a gate electrode of the driving transistor Td and the first capacitor electrode Ce1; wherein the gate electrode of the driving transistor Td is connected to the second electrode of the hysteresis reduction transistor Thr; and the first capacitor electrode Ce1 is connected to the first electrode of the hysteresis reduction transistor Thr.

Referring to FIG. 12, the pixel driving circuit further includes a first reset transistor Tr1 having a gate electrode connected to a first reset control signal line rst1, a first electrode connected to an initialization signal line Vint, and a second electrode connected to the first capacitor electrode Ce1; a first transistor T1 having a gate electrode connected to a light emission control signal line em, a first electrode connected to the second electrode of the driving transistor Td, and a second electrode connected to an anode of a light emitting element LE; a second transistor T2 having a gate electrode connected to the gate line of the present stage GLn, a first electrode connected to the first capacitor electrode Ce1, and a second electrode connected to the second electrode of the driving transistor Td and the first electrode of the first transistor T1; a data write transistor Tdw having a gate electrode connected to a gate line of a present stage GLn, a first electrode connected to a data line DL, and a second electrode connected to a first electrode of the driving transistor Td; a third transistor T3 having a gate electrode connected to the light emission control signal line em, a first electrode connected to the voltage supply signal line Vdd, and a second electrode connected to the first electrode of the driving transistor Td and the second electrode of the data write transistor Tdw; and a second reset transistor Tr2 having a gate electrode connected to a second reset control signal line rst2, a first electrode connected to an initialization signal line Vint, and a second electrode connected to the anode of the light emitting element LE. A cathode of the light emitting element is connected to a low voltage signal line Vss.

Figure 13:
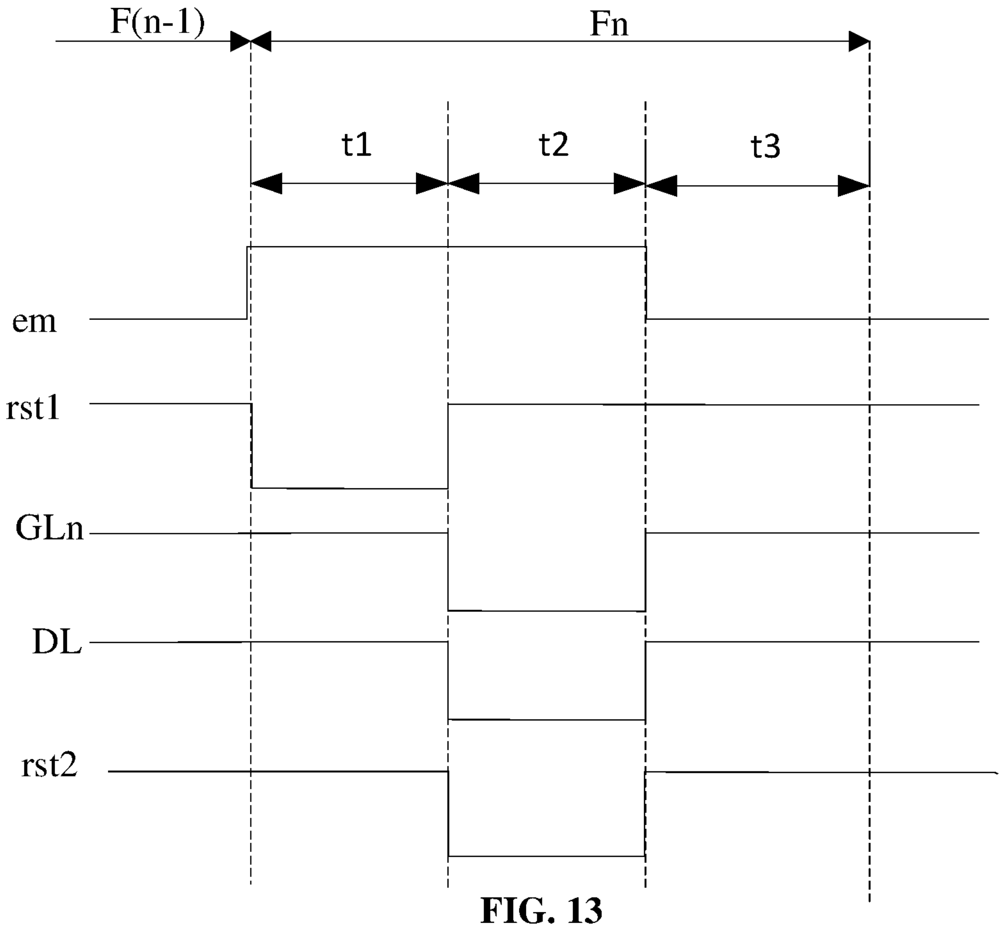
FIG. 13 is a timing diagram of operating a display panel having a pixel driving circuit depicted in FIG. 12.

FIG. 13 is a timing diagram of operating a display panel having a pixel driving circuit depicted in FIG. 12. Referring to FIG. 12 and FIG. 13, in one example, gate electrodes of the hysteresis reduction transistor Thr, the data write transistor Tdw, and the second transistor T2 are connected to a gate line of a present stage GLn. In the reset phase t1, a turning-off signal is transmitted through the gate line of the present stage Gln to the gate electrodes of the hysteresis reduction transistor Thr, the data write transistor Tdw, and the second transistor T2, thereby turning off the hysteresis reduction transistor Thr, the data write transistor Tdw, and the second transistor T2. A turning-on signal is transmitted through a first reset control signal line rst1 to the gate electrode of the first reset transistor Tr1, allowing an initialization signal to be transmitted to the first capacitor electrode Ce1. In the reset phase t1, a turning-off signal is transmitted through a light emission control signal line em to gate electrodes of the first transistor T1 and the third transistor T3, thereby turning off the first transistor T1 and the third transistor T3.

In the data write phase t2, a turning-on signal is transmitted through the gate line of the present stage Gln to the gate electrodes of the hysteresis reduction transistor Thr, the data write transistor Tdw, and the second transistor T2, thereby turning on the hysteresis reduction transistor Thr, the data write transistor Tdw, and the second transistor T2. A turning-off signal is transmitted through the first reset control signal line rst1 to the gate electrode of the first reset transistor Tr1, thereby turning off the first reset transistor Tr1. In the data write phase t2, a turning-off signal is transmitted through the light emission control signal line em to gate electrodes of the first transistor T1 and the third transistor T3, thereby turning off the first transistor T1 and the third transistor T3. In the data write phase t2, a turning-on signal is transmitted through a second reset control signal line rst2 to a gate electrode of the second reset transistor Tr2, allowing an initialization signal to be transmitted to the anode of the light emitting element LE.

In the light emission phase t3, a turning-off signal is transmitted through the gate line of the present stage Gln to the gate electrodes of the hysteresis reduction transistor Thr, the data write transistor Tdw, and the second transistor T2, thereby turning off the hysteresis reduction transistor Thr, the data write transistor Tdw, and the second transistor T2. A turning-off signal is transmitted through the first reset control signal line rst1 to the gate electrode of the first reset transistor Tr1, thereby turning off the first reset transistor Tr1. A turning-off signal is transmitted through the second reset control signal line rst2 to the gate electrode of the second reset transistor Tr2, thereby turning off the second reset transistor Tr2. In the light emission phase t3, a turning-on signal is transmitted through the light emission control signal line em to gate electrodes of the first transistor T1 and the third transistor T3, thereby turning on the first transistor T1 and the third transistor T3.

Figure 14:
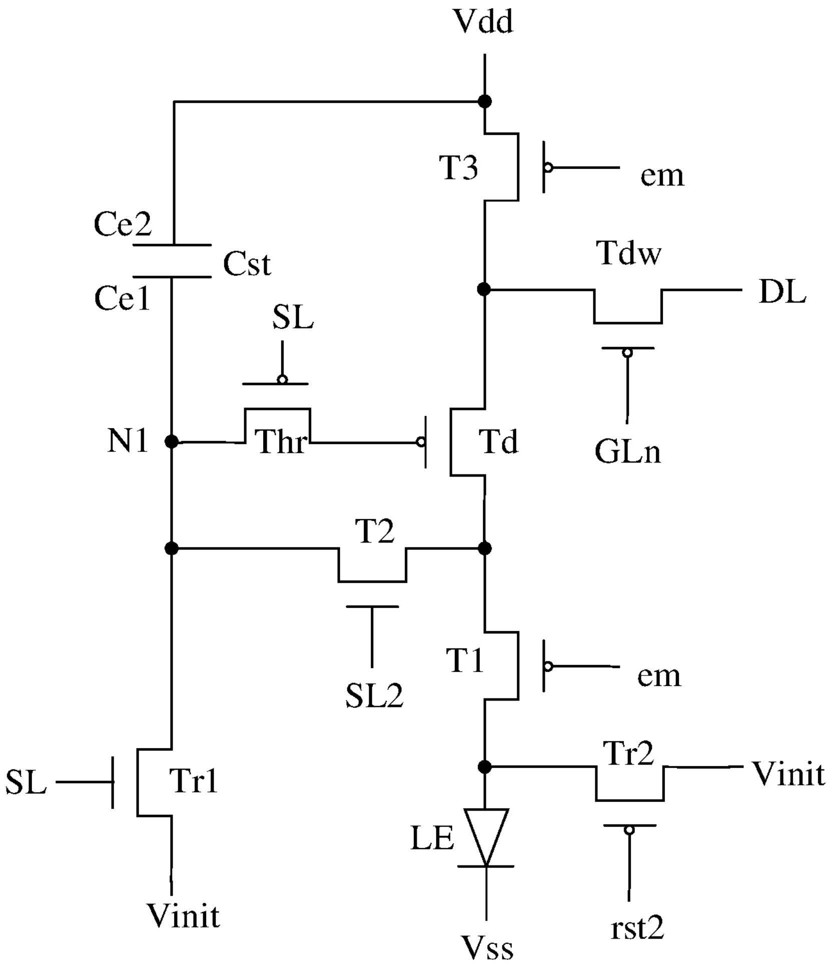
FIG. 14 is a circuit diagram of a pixel driving circuit in some embodiments according to the present disclosure.

In some embodiments, the pixel driving circuit is a pixel driving circuit having one or more p-type transistors and one or more n-type transistors. FIG. 14 is a circuit diagram of a pixel driving circuit in some embodiments according to the present disclosure. Referring to FIG. 14, in one example, the first reset transistor Tr1 and the second transistor T2 are n-type transistors such as metal oxide transistors. Because metal oxide transistors typically have a very small leakage, the voltage level at the N1 node (connected to the first reset transistor Tr1 and the second transistor T2) can be stably maintained, particularly suitable for display panels having a relatively low frame frequency and a relatively long frame period.

Figure 15:
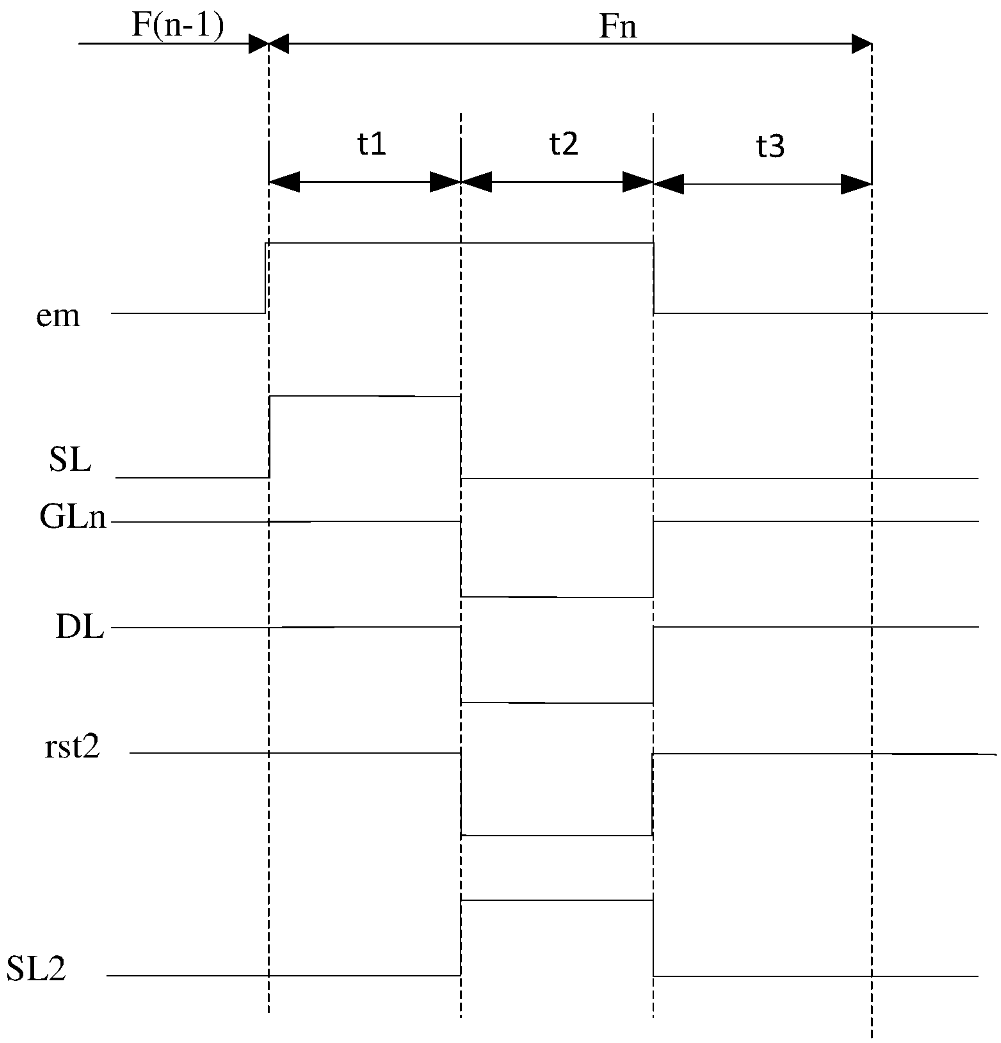
FIG. 15 is a timing diagram of operating a display panel having a pixel driving circuit depicted in FIG. 14.

In some embodiments, gate electrodes of the first reset transistor Tr1 and the hysteresis reduction transistor Thr are configured to be provided with a same scanning signal. Referring to FIG. 14, gate electrodes of the first reset transistor Tr1 and the hysteresis reduction transistor Thr are connected to the scan line SL. FIG. 15 is a timing diagram of operating a display panel having a pixel driving circuit depicted in FIG. 14. Referring to FIG. 14 and FIG. 15, in the reset phase t1, a first scanning signal passes from the scan line SL to gate electrodes of the first reset transistor Tr1 and the hysteresis reduction transistor Thr. The first scanning signal is a turning on signal with respect to the first reset transistor Tr1, which is a n-type transistor; and the first scanning signal is a turning off signal with respect to the hysteresis reduction transistor Thr, which is a p-type transistor. In the reset phase t1, the first reset transistor Tr1 is turned on, allowing an initialization signal to pass to the first capacitor electrode Ce1; and the hysteresis reduction transistor Thr is turned off to electrically disconnect the gate electrode of the driving transistor Td from the first capacitor electrode Ce1.

In the data write phase t2, a second scanning signal passes from the scan line SL to gate electrodes of the first reset transistor Tr1 and the hysteresis reduction transistor Thr. The second scanning signal is a turning off signal with respect to the first reset transistor Tr1, which is a n-type transistor; and the second scanning signal is a turning on signal with respect to the hysteresis reduction transistor Thr, which is a p-type transistor. In the data write phase t2, the first reset transistor Tr1 is turned off; and the hysteresis reduction transistor Thr is turned on to electrically connect the gate electrode of the driving transistor Td to the first capacitor electrode Ce1.

The gate electrode of the second transistor T2, which is also a n-type transistor, is connected to a second scan line SL2. In the reset phase t1, a third scanning signal passes from the second scan line SL2 to the gate electrode of the second transistor T2. The third scanning signal is a turning off signal with respect to the second transistor T2, which is a n-type transistor. In the data write phase t2, a fourth scanning signal passes from the second scan line SL2 to the gate electrode of the second transistor T2. The fourth scanning signal is a turning on signal with respect to the second transistor T2. The second transistor T2 is turned on in the data write phase t2, allowing a voltage signal pass from the voltage supply signal line Vdd through the driving transistor Td and the second transistor T2 to the first capacitor electrode Ce1 (the N1 node), rapidly charging the first capacitor electrode Ce1.

Figure 16:
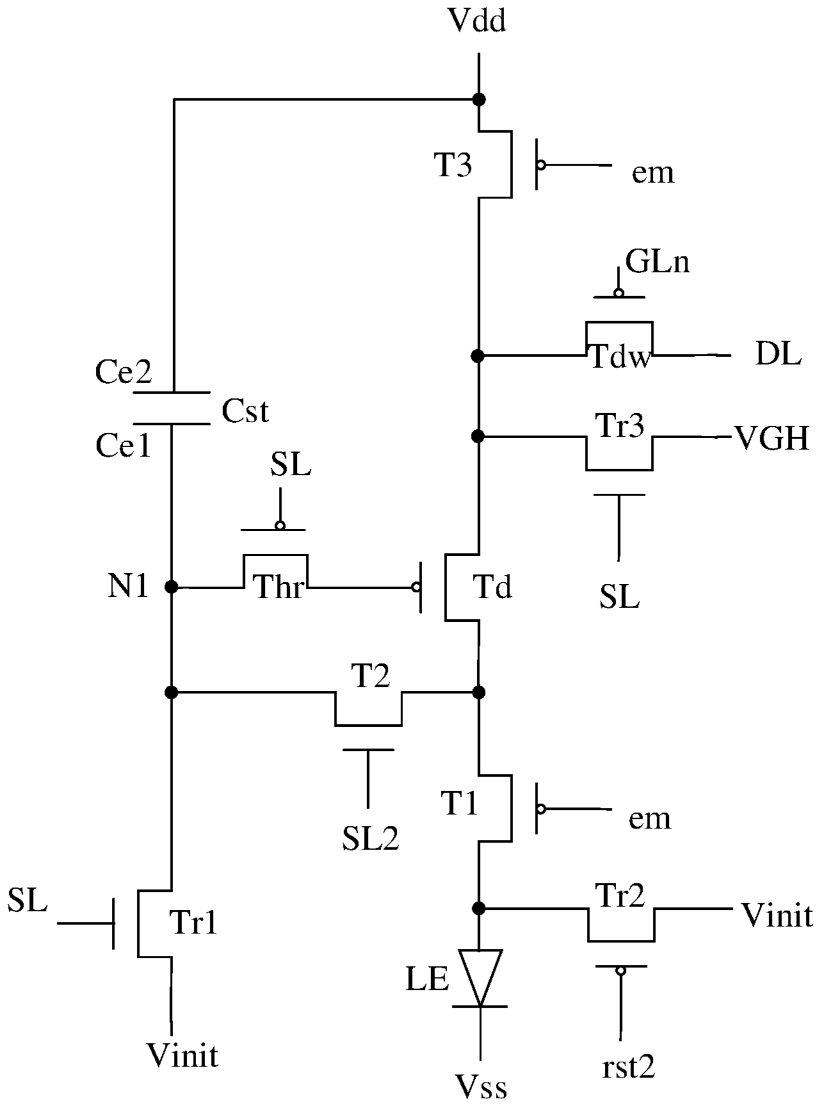
FIG. 16 is a circuit diagram of a pixel driving circuit in some embodiments according to the present disclosure.
Figure 17:
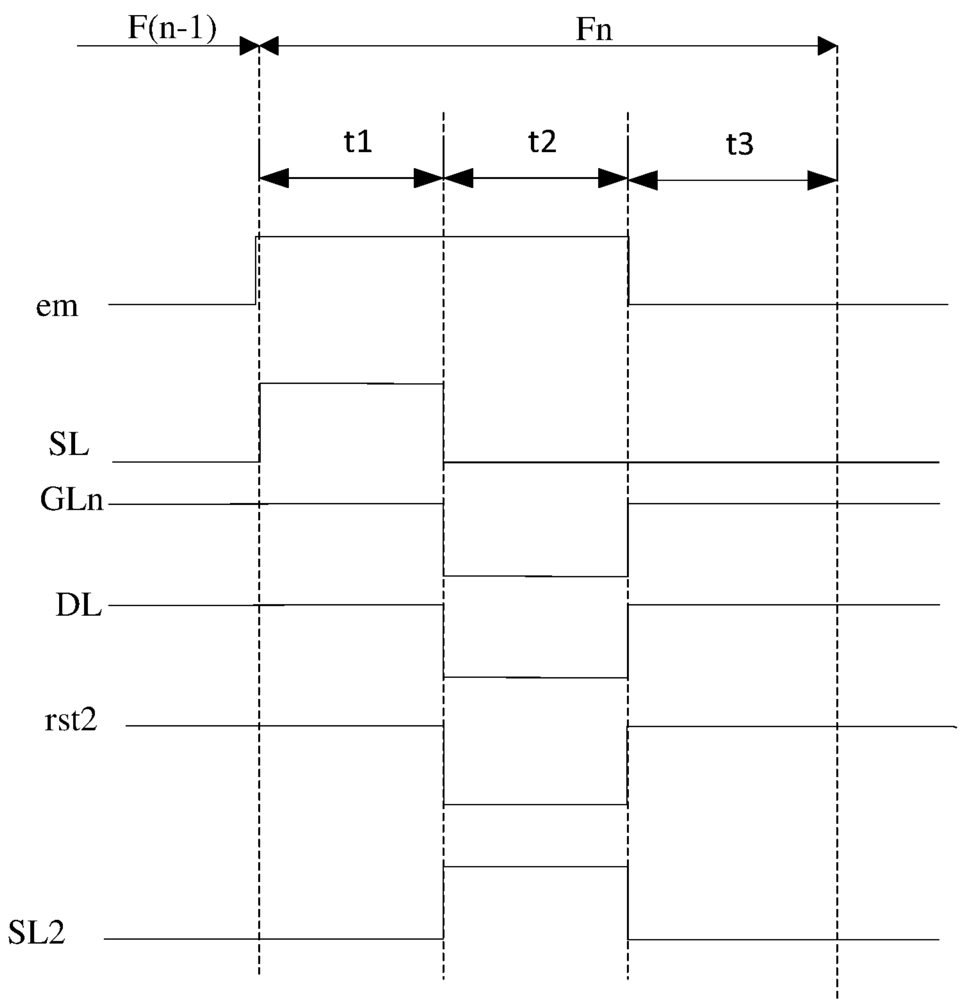
FIG. 17 is a timing diagram of operating a display panel having a pixel driving circuit depicted in FIG. 16.

FIG. 16 is a circuit diagram of a pixel driving circuit in some embodiments according to the present disclosure. Referring to FIG. 16, in some embodiments, the pixel driving circuit further includes a third reset transistor Tr3 having a gate electrode connected to a scan line SL, a first electrode connected to a high voltage signal line VGH, and a second electrode connected to the first electrode of the driving transistor Td. The example depicted in FIG. 16 differs from that depicted in FIG. 14 in that the pixel driving circuit in FIG. 16 has the third reset transistor Tr3. FIG. 17 is a timing diagram of operating a display panel having a pixel driving circuit depicted in FIG. 16. As shown in FIG. 17, in the reset phase t1, a first scanning signal passes from the scan line SL to gate electrodes of the first reset transistor Tr1, the third reset transistor Tr3, and the hysteresis reduction transistor Thr. The first scanning signal is a turning on signal with respect to the first reset transistor Tr1 and the third reset transistor Tr3, which are n-type transistors; and the first scanning signal is a turning off signal with respect to the hysteresis reduction transistor Thr, which is a p-type transistor. In the reset phase t1, the first reset transistor Tr1 and the third reset transistor Tr3 are turned on, allowing an initialization signal to pass to the first capacitor electrode Ce1 and the first electrode of the driving transistor Td, respectively; and the hysteresis reduction transistor Thr is turned off to electrically disconnect the gate electrode of the driving transistor Td from the first capacitor electrode Ce1.

In the data write phase t2, a second scanning signal passes from the scan line SL to gate electrodes of the first reset transistor Tr1, the third reset transistor Tr3, and the hysteresis reduction transistor Thr. The second scanning signal is a turning off signal with respect to the first reset transistor Tr1 and the third reset transistor Tr3, which are n-type transistors; and the second scanning signal is a turning on signal with respect to the hysteresis reduction transistor Thr, which is a p-type transistor. In the data write phase t2, the first reset transistor Tr1 and the third reset transistor Tr3 are turned off; and the hysteresis reduction transistor Thr is turned on to electrically connect the gate electrode of the driving transistor Td to the first capacitor electrode Ce1.

The gate electrode of the second transistor T2, which is also a n-type transistor, is connected to a second scan line SL2. In the reset phase t1, a third scanning signal passes from the second scan line SL2 to the gate electrode of the second transistor T2. The third scanning signal is a turning off signal with respect to the second transistor T2, which is a n-type transistor. In the data write phase t2, a fourth scanning signal passes from the second scan line SL2 to the gate electrode of the second transistor T2. The fourth scanning signal is a turning on signal with respect to the second transistor T2. The second transistor T2 is turned on in the data write phase t2, allowing a voltage signal pass from the voltage supply signal line Vdd through the driving transistor Td and the second transistor T2 to the first capacitor electrode Ce1 (the N1 node), rapidly charging the first capacitor electrode Ce1.

Figure 18:
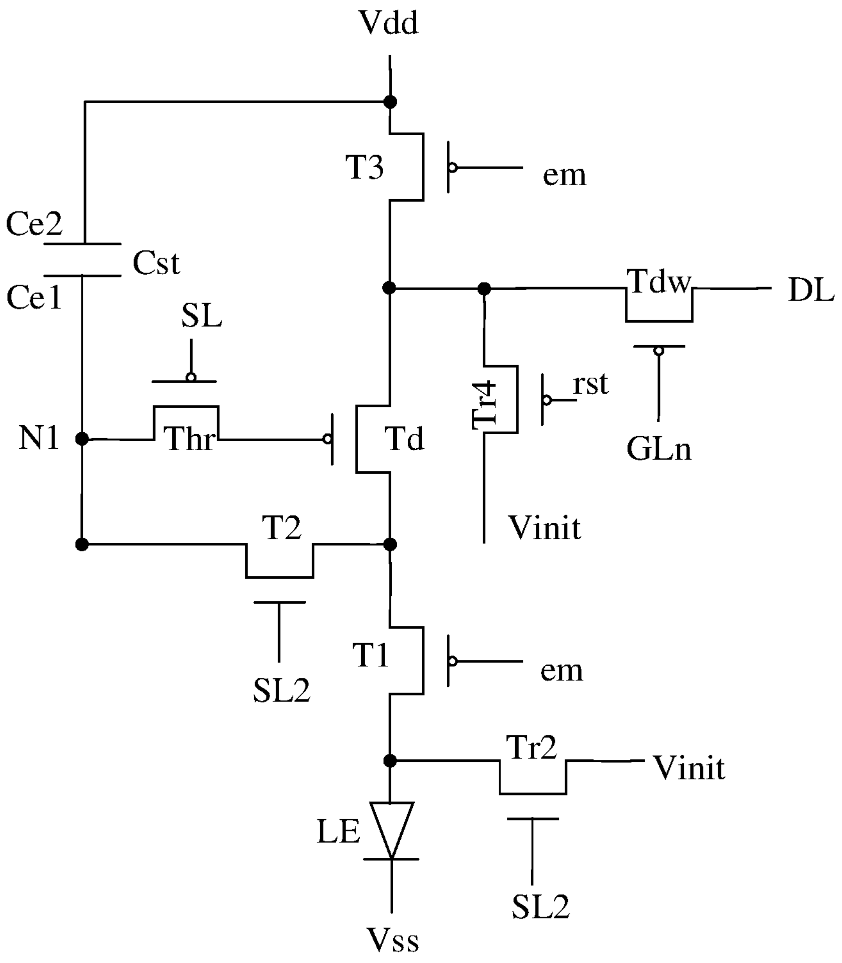
FIG. 18 is a circuit diagram of a pixel driving circuit in some embodiments according to the present disclosure.
Figure 19:
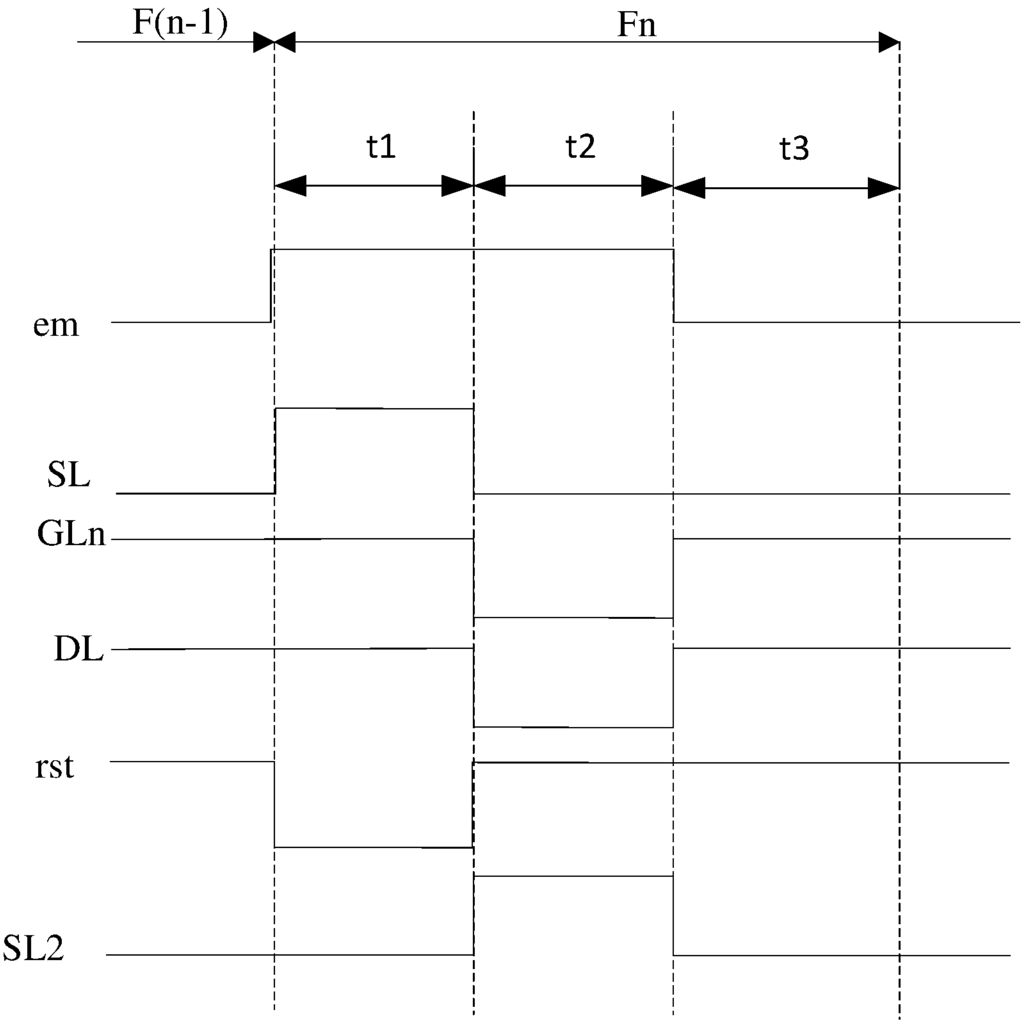
FIG. 19 is a timing diagram of operating a display panel having a pixel driving circuit depicted in FIG. 18.

FIG. 18 is a circuit diagram of a pixel driving circuit in some embodiments according to the present disclosure. Referring to FIG. 18, in some embodiments, the pixel driving circuit further includes a fourth reset transistor Tr4 having a gate electrode connected to a scan line SL, a first electrode connected to a reset signal line Vint, and a second electrode connected to the first electrode of the driving transistor Td and the second electrode of the data write transistor Tdw. The example depicted in FIG. 18 differs from that depicted in FIG. 14 in that the pixel driving circuit in FIG. 18 has the fourth reset transistor Tr4, and does not have a first reset transistor Tr1. FIG. 19 is a timing diagram of operating a display panel having a pixel driving circuit depicted in FIG. 18. As shown in FIG. 19, in the reset phase t1, a first scanning signal passes from the scan line SL to the gate electrode of the hysteresis reduction transistor Thr. The first scanning signal is a turning off signal with respect to the hysteresis reduction transistor Thr, which is a p-type transistor. In the reset phase t1, the hysteresis reduction transistor Thr is turned off to electrically disconnect the gate electrode of the driving transistor Td from the first capacitor electrode Ce1.

In the data write phase t2, a second scanning signal passes from the scan line SL to the gate electrode of the hysteresis reduction transistor Thr. The second scanning signal is a turning on signal with respect to the hysteresis reduction transistor Thr, which is a p-type transistor. In the data write phase t2, the hysteresis reduction transistor Thr is turned on to electrically connect the gate electrode of the driving transistor Td to the first capacitor electrode Ce1.

Gate electrodes of the second transistor T2 and the second reset transistor Tr2, which are n-type transistors, are connected to a second scan line SL2, respectively. In the reset phase t1, a third scanning signal passes from the second scan line SL2 to the gate electrodes of the second transistor T2 and the second reset transistor Tr2. The third scanning signal is a turning off signal with respect to the second transistor T2 and the second reset transistor Tr2, which are n-type transistors. In the data write phase t2, a fourth scanning signal passes from the second scan line SL2 to the gate electrodes of the second transistor T2 and the second reset transistor Tr2. The fourth scanning signal is a turning on signal with respect to the second transistor T2 and the second reset transistor Tr2. The second transistor T2 is turned on in the data write phase t2, allowing a voltage signal pass from the voltage supply signal line Vdd through the driving transistor Td and the second transistor T2 to the first capacitor electrode Ce1 (the N1 node), rapidly charging the first capacitor electrode Ce1. The second reset transistor Tr2 is turned on in the data write phase t2, allowing an initialization signal to pass to the anode of the light emitting element LE.

Figure 20:
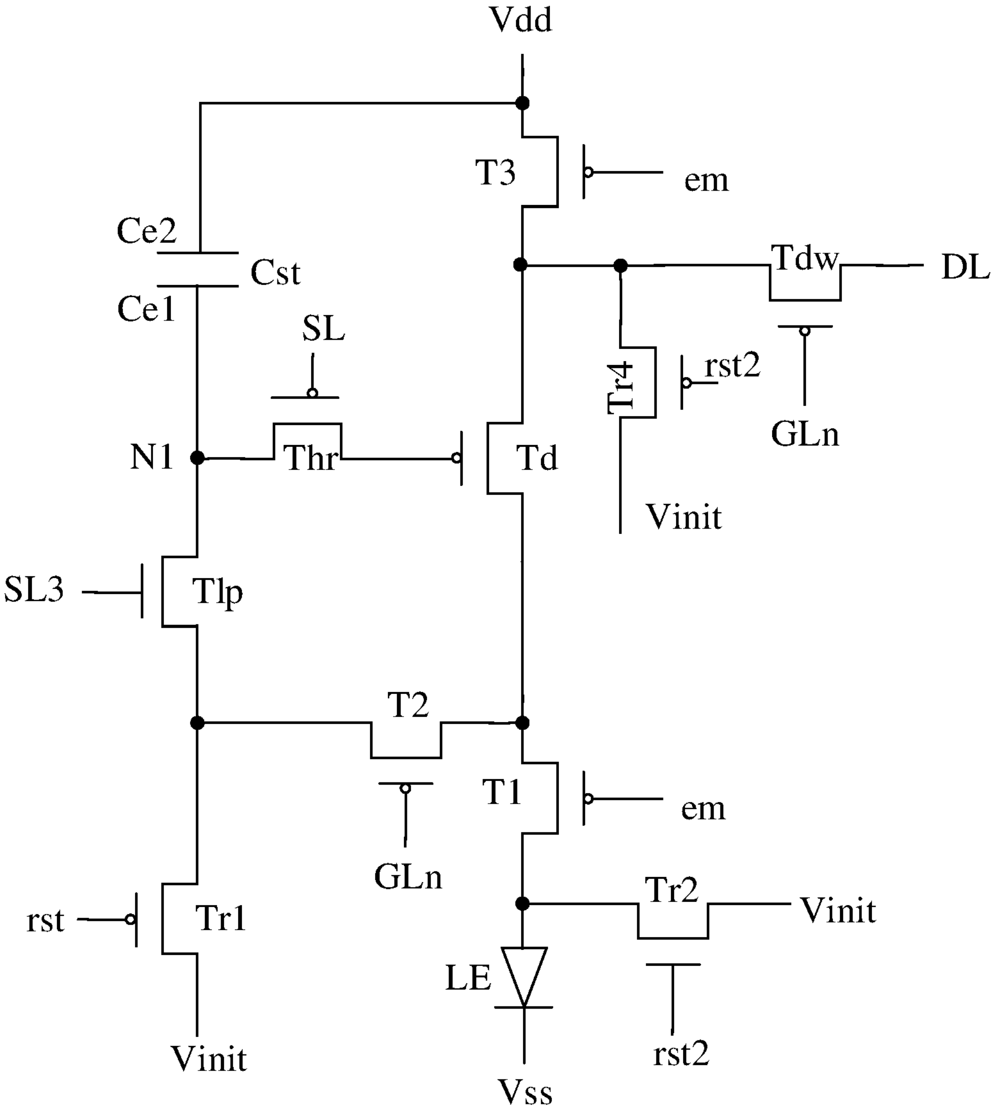
FIG. 20 is a circuit diagram of a pixel driving circuit in some embodiments according to the present disclosure.

FIG. 20 is a circuit diagram of a pixel driving circuit in some embodiments according to the present disclosure. Referring to FIG. 20, in some embodiments, the pixel driving circuit further includes a leakage prevention transistor Tlp having a gate electrode connected to a third scan line SL3, a first electrode connected to a first capacitor electrode Ce1, and a second electrode connected to the first electrode of the second transistor T2 and the second electrode of the first reset transistor Tr1; and a fourth reset transistor Tr4 having a gate electrode connected to a scan line SL, a first electrode connected to a reset signal line Vint, and a second electrode connected to the first electrode of the driving transistor Td and the second electrode of the data write transistor Tdw. The example depicted in FIG. 18 differs from that depicted in FIG. 12 in that the pixel driving circuit in FIG. 18 has the leakage prevention transistor Tlp and the fourth reset transistor Tr4. The second reset transistor Tr2 and the leakage prevention transistor Tlp are n-type transistors.

Figure 21:
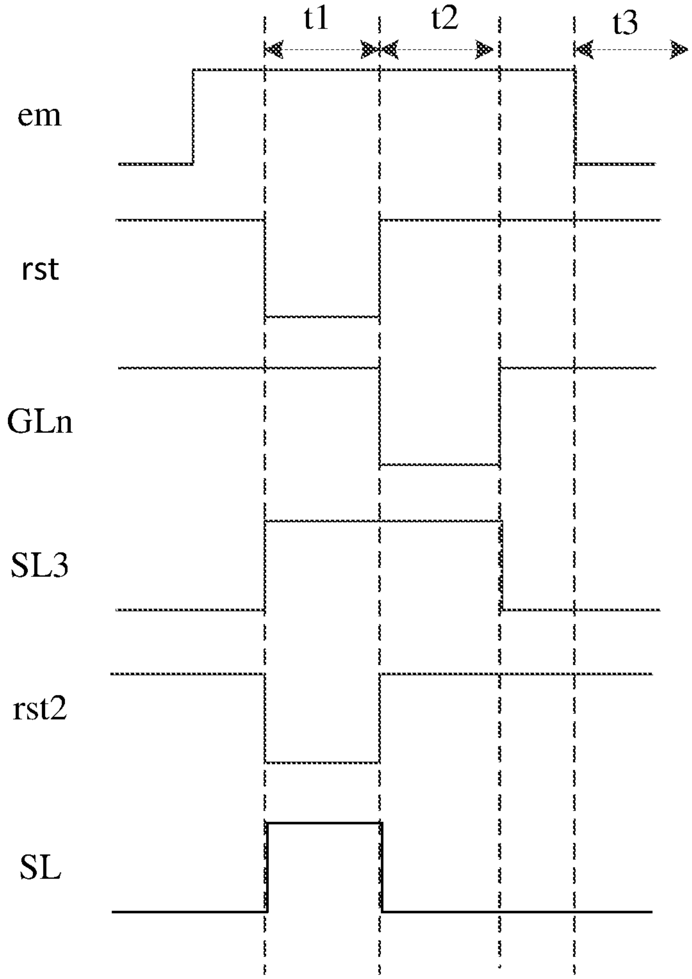
FIG. 21 is a timing diagram of operating a display panel having a pixel driving circuit depicted in FIG. 20.

Referring to FIG. 20, the gate electrode of the hysteresis reduction transistor Thr are connected to the scan line SL. FIG. 21 is a timing diagram of operating a display panel having a pixel driving circuit depicted in FIG. 20. Referring to FIG. 20 and FIG. 21, in the reset phase t1, a first scanning signal passes from the scan line SL to the gate electrode of the hysteresis reduction transistor Thr. The first scanning signal is a turning off signal with respect to the hysteresis reduction transistor Thr, which is a p-type transistor. In the reset phase t1, the hysteresis reduction transistor Thr is turned off to electrically disconnect the gate electrode of the driving transistor Td from the first capacitor electrode Ce1. Gate electrodes of the data write transistor Tdw and the second transistor T2 are connected to a gate line of a present stage GLn. In the reset phase t1, a turning-off signal is transmitted through the gate line of the present stage Gln to the gate electrodes of the data write transistor Tdw and the second transistor T2, thereby turning off the data write transistor Tdw and the second transistor T2. A turning-on signal is transmitted through a reset control signal line to the gate electrode of the first reset transistor Tr1, and a turning-on signal is transmitted through a third scan line SL3 to the leakage prevention transistor Tlp, allowing an initialization signal to be transmitted to the first capacitor electrode Ce1. In the reset phase t1, a turning-off signal is transmitted through a light emission control signal line em to gate electrodes of the first transistor T1 and the third transistor T3, thereby turning off the first transistor T1 and the third transistor T3.

In the data write phase t2, a second scanning signal passes from the scan line SL to gate electrodes of the hysteresis reduction transistor Thr. The second scanning signal is a turning on signal with respect to the hysteresis reduction transistor Thr, which is a p-type transistor. In the data write phase t2, the hysteresis reduction transistor Thr is turned on to electrically connect the gate electrode of the driving transistor Td to the first capacitor electrode Ce1. In the data write phase t2, a turning-on signal is transmitted through the gate line of the present stage Gln to the gate electrodes of the data write transistor Tdw and the second transistor T2, thereby turning on the data write transistor Tdw and the second transistor T2. A turning-off signal is transmitted through the reset control signal line to the gate electrode of the first reset transistor Tr1, thereby turning off the reset transistor Tr. In the data write phase t2, a turning-off signal is transmitted through the light emission control signal line em to gate electrodes of the first transistor T1 and the third transistor T3, thereby turning off the first transistor T1 and the third transistor T3.

In another aspect, the present disclosure provides a display panel. In some embodiments, the display panel includes the pixel driving circuit described herein or fabricated by a method described herein, and a light emitting element connected to the pixel driving circuit. The display panel further includes a scan line. In some embodiments, the switch includes a hysteresis reduction transistor having a first electrode connected to the first capacitor electrode, a second electrode connected to a gate electrode of the driving transistor, and a gate electrode connected to the scan line. The scan line may be a signal line dedicated to the hysteresis reduction transistor. Alternatively, in some embodiments, the scan line may be shared by one or more other transistors.

In some embodiments, the display panel further includes a reset transistor configured to initialize the first capacitor electrode in a reset phase of the operation. Optionally, gate electrodes of the reset transistor and the hysteresis reduction transistor are configured to be provided with a same scanning signal. Optionally, the reset transistor is a n-type transistor; and the driving transistor and the hysteresis reduction transistor are p-type transistors. Optionally, gate electrodes of the reset transistor and the hysteresis reduction transistor are connected to a same scan line.

In some embodiments, the display panel further includes a data write transistor configured to allow a data signal to pass through in a data write phase of the operation. Optionally, gate electrodes of the data write transistor and the hysteresis reduction transistor are configured to be provided with a same scanning signal. Optionally, the scan line is a gate line of a present stage; and gate electrodes of the data write transistor and the hysteresis reduction transistor are connected to the gate line.

In another aspect, the present disclosure provides a method of driving a display panel. In some embodiments, in a present frame of image display, the method includes electrically disconnecting a gate electrode of a driving transistor from a first capacitor electrode of a storage capacitor for a first period of time during operation of a pixel driving circuit; and electrically connecting the gate electrode of the driving transistor to the first capacitor electrode for a second period of time during operation of the pixel driving circuit.

In some embodiments, in a reset phase of the operation, the method includes turning on a reset transistor, allowing an initialization signal to pass through the reset transistor to initialize the first capacitor electrode; and electrically disconnecting the gate electrode of the driving transistor from the first capacitor electrode during at least a portion of a period in which the reset transistor is turned on.

In some embodiments, in a data write phase of the operation, the method includes turning on a data write transistor, allowing a data signal to pass through the data write transistor; and electrically connecting the gate electrode of the driving transistor to the first capacitor electrode during at least a portion of a period in which the data write transistor is turned on.

In some embodiments, the first period of time includes at least a portion of a reset phase of the operation; and the second period of time includes at least a portion of a data write phase of the operation. Various appropriate implementations of the present method may be practiced.

Figure 22:
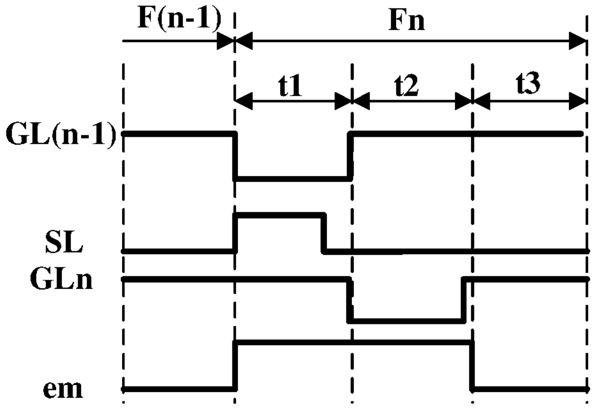
FIG. 22 is a timing diagram of operating a display panel having a pixel driving circuit depicted in FIG. 6.

FIG. 22 is a timing diagram of operating a display panel having a pixel driving circuit depicted in FIG. 6. Referring to FIG. 6 and FIG. 22, in some embodiments, the first period of time includes only a portion of the reset phase t1. Optionally, the reset phase t1 includes a first sub-phase and a second sub-phase, the first sub-phase being earlier in time than the second sub-phase; and the first period of time includes only the first sub-phase. Optionally, the second period of time includes the second sub-phase and the data write phase t2, as shown in FIG. 22. By having this driving scheme, the voltage level at the gate electrode of the driving transistor can be negatively bias in advance of the data write phase t2, ensuring sufficient time for Vth detection.

Figure 23:
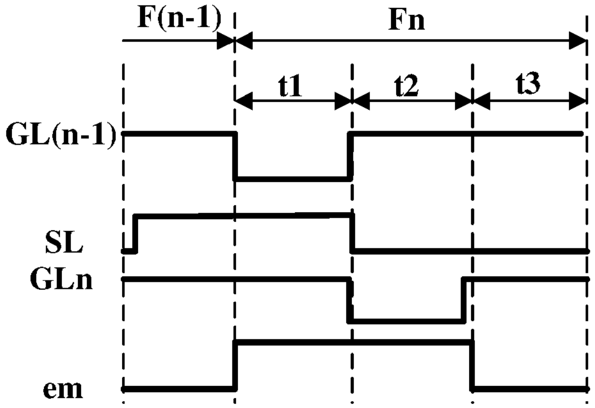
FIG. 23 is a timing diagram of operating a display panel having a pixel driving circuit depicted in FIG. 6.

FIG. 23 is a timing diagram of operating a display panel having a pixel driving circuit depicted in FIG. 6. Referring to FIG. 6 and FIG. 23, the first period of time in some embodiments includes at least a portion of a reset phase t1 of the operation in the present frame of image display, and at least a portion of a light emission phase t3 of the operation in a previous frame of image display. By having this driving scheme, a light emission control signal line of a previous stage may be used as the scan line SL for controlling the hysteresis reduction transistor Thr.

In the embodiments of the present disclosure, the hysteresis reduction transistor Thr may be formed together with other transistors of the pixel driving circuit, for example, may be formed together with at least one of the first transistor T1, the data write transistor Tdw, the second transistor T2, the third transistor T3, the first reset transistor Tr1, or the second reset transistor Tr2.

In the embodiments of the present disclosure, the hysteresis reduction transistor Thr may be an N-type transistor or a P-type transistor, and may have an active layer made of a low temperature polycrystalline silicon material or an oxide semiconductor material, as long as it serves to control the connection or disconnection between the gate of the driving transistor Td and the first capacitor electrode.

In the embodiments of the present disclosure, the hysteresis reduction transistor Thr may have substantially the same channel width to length ratio as other transistors in the pixel driving circuit, for example, it may have substantially the same channel width to length ratio as at least one of the first transistor T1, the data write transistor Tdw, the second transistor T2, the third transistor T3, the first reset transistor Tr1, or the second reset transistor Tr2, as long as it serves to control the connection or disconnection between the gate of the driving transistor Td and the first capacitor electrode, i.e., as a transistor having a switching function.

In the embodiments of the present disclosure, the hysteresis reduction transistor Thr may be designed to have an off-state leakage current and parasitic capacitance as small as possible, for example, the channel width and/or channel area of the hysteresis reduction transistor Thr may be reduced; for example, the channel width and/or channel area of the hysteresis reduction transistor Thr may be smaller than the channel width and/or channel area of at least one of the first transistor T1, the data write transistor Tdw, the second transistor T2, the third transistor T3, the first reset transistor Tr1, or the second reset transistor Tr2.

It should be noted that "substantially" means that the error range can be within 10%, for example, considering process errors and other factors.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A pixel driving circuit, comprising:

a storage capacitor comprising a first capacitor electrode and a second capacitor electrode;

a driving transistor configured to generate a driving current; and a switch configured to control connection or disconnection between a gate electrode of the driving transistor and the first capacitor electrode;

a reset transistor having a first electrode connected to an initialization signal line, a second electrode connected to the first capacitor electrode;

a data write transistor having a first electrode connected to a data line, and a gate electrode connected to a gate line;

a first transistor having a first electrode connected to a second electrode of the driving transistor, a gate electrode connected to a light emission control signal line, and a second electrode connected to an anode of a light emitting element; and a second transistor having a first electrode connected to the first capacitor electrode, and a second electrode connected to the second electrode of the driving transistor;

wherein the switch comprises a transistor comprising a first electrode connected to the first capacitor electrode, a second electrode connected to the gate electrode of the driving transistor, and a gate electrode connected to a scan line;

the reset transistor and the second transistor are n-type transistors; and the driving transistor, the first transistor, the data write transistor, the transistor of the switch are p-type transistors.

2. The pixel driving circuit of claim 1, wherein the switch is configured to electrically disconnect the gate electrode of the driving transistor from the first capacitor electrode for a first period of time during operation of the pixel driving circuit and to electrically connect the gate electrode of the driving transistor to the first capacitor electrode for a second period of time during operation of the pixel driving circuit.

3. The pixel driving circuit of claim 2, wherein the first period of time comprises at least a portion of a reset phase of the operation; and the second period of time comprises at least a portion of a data write phase of the operation.

4. The pixel driving circuit of claim 1, further comprising the reset transistor configured to initialize the first capacitor electrode in a reset phase of the operation;

wherein the switch is configured to electrically disconnect the gate electrode of the driving transistor from the first capacitor electrode during at least a portion of a period in which the reset transistor is turned on.

5. The pixel driving circuit of claim 1, further comprising the data write transistor configured to allow a data signal to pass through in a data write phase of the operation;

wherein the switch is configured to electrically connect the gate electrode of the driving transistor to the first capacitor electrode during at least a portion of a period in which the data write transistor is turned on.

6. The pixel driving circuit of claim 1, wherein all transistors are p-type transistors.

7. A display panel, comprising:

a pixel driving circuit; and a light emitting element connected to the pixel driving circuit;

a scan line; and a reset transistor;

wherein the pixel driving circuit comprises:

a storage capacitor comprising a first capacitor electrode and a second capacitor electrode;

a driving transistor configured to generate a driving current; and a switch configured to control connection or disconnection between a gate electrode of the driving transistor and the first capacitor electrode;

wherein the reset transistor is configured to initialize the first capacitor electrode in a reset phase of operation of the pixel driving circuit;

wherein the switch comprises a transistor comprising a first electrode connected to the first capacitor electrode, a second electrode connected to the gate electrode of the driving transistor, and a gate electrode connected to the scan line;

wherein gate electrodes of the reset transistor and the transistor of the switch are configured to be provided with a same scanning signal;

wherein the reset transistor is a n-type transistor; and the driving transistor and the transistor of the switch are p-type transistors.

8. The display panel of claim 7, wherein gate electrodes of the reset transistor and the transistor of the switch are connected to a same scan line.

9. The display panel of claim 7, further comprising a data write transistor configured to allow a data signal to pass through in a data write phase of operation of the pixel driving circuit;

wherein gate electrodes of the data write transistor and the transistor of the switch are configured to be provided with a same scanning signal.

10. The display panel of claim 9, wherein the scan line is a gate line of a present stage; and gate electrodes of the data write transistor and the transistor of the switch are connected to the gate line of the present stage.

11. The display panel of claim 7, wherein the scan line is a light emission control signal line of a previous stage.

12. A method of driving a display panel, in a present frame of image display, comprising:

electrically disconnecting a gate electrode of a driving transistor from a first capacitor electrode of a storage capacitor for a first period of time during operation of a pixel driving circuit; and electrically connecting the gate electrode of the driving transistor to the first capacitor electrode for a second period of time during operation of the pixel driving circuit;

wherein the pixel driving circuit includes:

the storage capacitor comprising the first capacitor electrode and a second capacitor electrode;

the driving transistor configured to generate a driving current;

a reset transistor; and a switch configured to control connection or disconnection between the gate electrode of the driving transistor and the first capacitor electrode;

wherein the switch comprises a transistor comprising a first electrode connected to the first capacitor electrode, a second electrode connected to the gate electrode of the driving transistor, and a gate electrode connected to a scan line;

wherein the method further comprises:

initializing, by the reset transistor, the first capacitor electrode in a reset phase of operation of the pixel driving circuit;

providing a same scanning signal to gate electrodes of the reset transistor and the transistor of the switch;

wherein the reset transistor is a n-type transistor; and the driving transistor and the transistor of the switch are p-type transistors.

13. The method of claim 12, wherein the first period of time comprises at least a portion of the reset phase of operation of the pixel driving circuit; and the second period of time comprises at least a portion of a data write phase of the operation.

14. The method of claim 13, wherein the reset phase comprises a first sub-phase and a second sub-phase, the first sub-phase being earlier in time than the second sub-phase;

the first period of time comprises only the first sub-phase; and the second period of time comprises the second sub-phase and at least a portion of the data write phase.

15. The method of claim 13, wherein the first period of time comprises at least a portion of the reset phase of the operation in the present frame of image display, and at least a portion of a light emission phase of the operation in a previous frame of image display.

* * * * *